US012749061B2

(12) United States Patent
Bedier et al.

(10) Patent No.: US 12,749,061 B2
(45) Date of Patent: *Sep. 29, 2026

(54) PAYMENT TERMINAL OPERATION METHOD AND SYSTEM THEREFOR

(71) Applicant: Poynt LLC, Tempe, AZ (US)

(72) Inventors: Osama Bedier, Palo Alto, CA (US); Ray Tanaka, Palo Alto, CA (US); Praveen Alavilli, Palo Alto, CA (US); Syed Fayez Asar, Palo Alto, CA (US); Victor Chau, Palo Alto, CA (US)

(73) Assignee: Poynt LLC, Tempe, AZ (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/303,452

(22) Filed: Apr. 19, 2023

(65) Prior Publication Data

US 2023/0252440 A1 Aug. 10, 2023

Related U.S. Application Data

(60) Continuation of application No. 16/933,317, filed on Jul. 20, 2020, now Pat. No. 11,704,648, which is a (Continued)

(51) Int. Cl.

| | |
|---|---|
| ***G06Q 20/20*** | (2012.01) |
| ***G06F 3/041*** | (2006.01) |
| ***G06F 3/14*** | (2006.01) |
| ***G06K 7/00*** | (2006.01) |
| ***G06Q 20/04*** | (2012.01) |

(Continued)

(52) U.S. Cl.

CPC ......... *G06Q 20/204* (2013.01); *G06K 7/0004* (2013.01); *G06Q 20/047* (2020.05); *G06Q 20/085* (2013.01); *G06Q 20/102* (2013.01); *G06Q 20/108* (2013.01); *G06Q 20/20* (2013.01); *G06Q 20/209* (2013.01); *G06Q 20/382* (2013.01); *G06Q 20/401* (2013.01); *G06Q 20/4016* (2013.01); *G07G 1/0009* (2013.01); *G07G 1/0018* (2013.01); *G07G 1/01* (2013.01); *G06F 3/041* (2013.01); *G06F 3/1423* (2013.01)

(58) Field of Classification Search

None

See application file for complete search history.

(56) References Cited

U.S. PATENT DOCUMENTS

| | | | |
|---|---|---|---|
| 4,731,842 | A | 3/1988 | Smith |
| 5,294,782 | A | 3/1994 | Kumar |

(Continued)

FOREIGN PATENT DOCUMENTS

| | | | | |
|---|---|---|---|---|
| KR | 20130126772 A | * 11/2013 | ............. | G06F 21/50 |
| WO | WO-2012054786 A1 | * 4/2012 | ............. | A63F 13/00 |

*Primary Examiner* — Ariel J Yu

(74) *Attorney, Agent, or Firm* — CHIP LAW GROUP

(57) ABSTRACT

A method of payment terminal operation, including: receiving a payment collection request for a payment from an application, generating a payment initiation request for the payment, sending the payment initiation request to a secure processing system, switching the secure processing system from operation in an unsecured mode to operation in a secured mode in response to receipt of the payment initiation request, facilitating payment information entry, and receiving a payment response notification, generated based on the payment information, at the main processor.

18 Claims, 16 Drawing Sheets

Related U.S. Application Data continuation of application No. 15/245,064, filed on Aug. 23, 2016, now Pat. No. 10,783,511, which is a division of application No. 14/526,112, filed on Oct. 28, 2014, now Pat. No. 9,721,242.

(51) Int. Cl.

| | |
|---|---|
| ***G06Q 20/08*** | (2012.01) |
| ***G06Q 20/10*** | (2012.01) |
| ***G06Q 20/38*** | (2012.01) |
| ***G06Q 20/40*** | (2012.01) |
| ***G07G 1/00*** | (2006.01) |
| ***G07G 1/01*** | (2006.01) |

(56) References Cited

U.S. PATENT DOCUMENTS

| | | | | |
|---|---|---|---|---|
| D391,555 | S | 3/1998 | Schlieffers et al. | |
| 5,761,306 | A | 6/1998 | Lewis | |
| 5,859,779 | A | 1/1999 | Giordano et al. | |
| D409,230 | S | 5/1999 | Gilbertson et al. | |
| D499,134 | S | 11/2004 | Enstrom | |
| 7,540,410 | B2 | 6/2009 | Templeton et al. | |
| 7,971,782 | B1 | 7/2011 | Shams | |
| 8,332,272 | B2 | 12/2012 | Fisher | |
| 8,600,881 | B2 | 12/2013 | Nguyen et al. | |
| 8,898,076 | B2 | 11/2014 | Vasquez et al. | |
| 8,903,093 | B2 | 12/2014 | Kim et al. | |
| 9,092,766 | B1 | 7/2015 | Bedier et al. | |
| 2004/0199470 | A1 | 10/2004 | Ferry et al. | |
| 2007/0241183 | A1 | 10/2007 | Brown et al. | |
| 2007/0290043 | A1 | 12/2007 | Russell et al. | |
| 2008/0184363 | A1 | 7/2008 | Narasimhan | |
| 2008/0227391 | A1 | 9/2008 | Rosenberg | |
| 2009/0119221 | A1* | 5/2009 | Weston | G07F 7/1025 705/64 |
| 2009/0319381 | A1* | 12/2009 | Armstrong | G06Q 30/02 705/17 |
| 2010/0169638 | A1 | 7/2010 | Farris | |
| 2010/0274688 | A1 | 10/2010 | Hammad | |
| 2011/0047081 | A1 | 2/2011 | Kelly et al. | |
| 2011/0259672 | A1 | 10/2011 | Kuo | |
| 2011/0302406 | A1 | 12/2011 | Machani | |
| 2012/0110663 | A1 | 5/2012 | Kim et al. | |
| 2013/0013515 | A1* | 1/2013 | Walters | G07F 7/1016 726/16 |
| 2013/0073448 | A1 | 3/2013 | Wall et al. | |
| 2013/0124855 | A1 | 5/2013 | Varadarajan et al. | |
| 2013/0145475 | A1 | 6/2013 | Ryu et al. | |
| 2013/0226815 | A1 | 8/2013 | Ibasco et al. | |
| 2013/0254053 | A1 | 9/2013 | Hayhow et al. | |
| 2013/0254117 | A1 | 9/2013 | von Mueller et al. | |
| 2013/0266141 | A1 | 10/2013 | Kim et al. | |
| 2014/0006190 | A1 | 1/2014 | Loomis et al. | |
| 2014/0256251 | A1 | 9/2014 | Caceres et al. | |
| 2014/0279474 | A1 | 9/2014 | Evans et al. | |
| 2015/0248664 | A1 | 9/2015 | Makhdumi et al. | |
| 2015/0254662 | A1 | 9/2015 | Radu | |
| 2016/0020906 | A1* | 1/2016 | Nolte | G06Q 20/3829 705/71 |
| 2016/0132873 | A1 | 5/2016 | Elbaum et al. | |

* cited by examiner

PAYMENT TERMINAL OPERATION METHOD AND SYSTEM THEREFOR

CROSS-REFERENCE TO RELATED APPLICATIONS

This application is a continuation of co-pending U.S. application Ser. No. 15/245,064, filed 23 Aug. 2016, which is a divisional of U.S. patent application Ser. No. 14/526,112 filed 28 Oct. 2014, each of which are incorporated in their entireties by this reference.

TECHNICAL FIELD

This invention relates generally to the payment terminal field, and more specifically to a new and useful payment terminal operation method in the payment terminal field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 3:
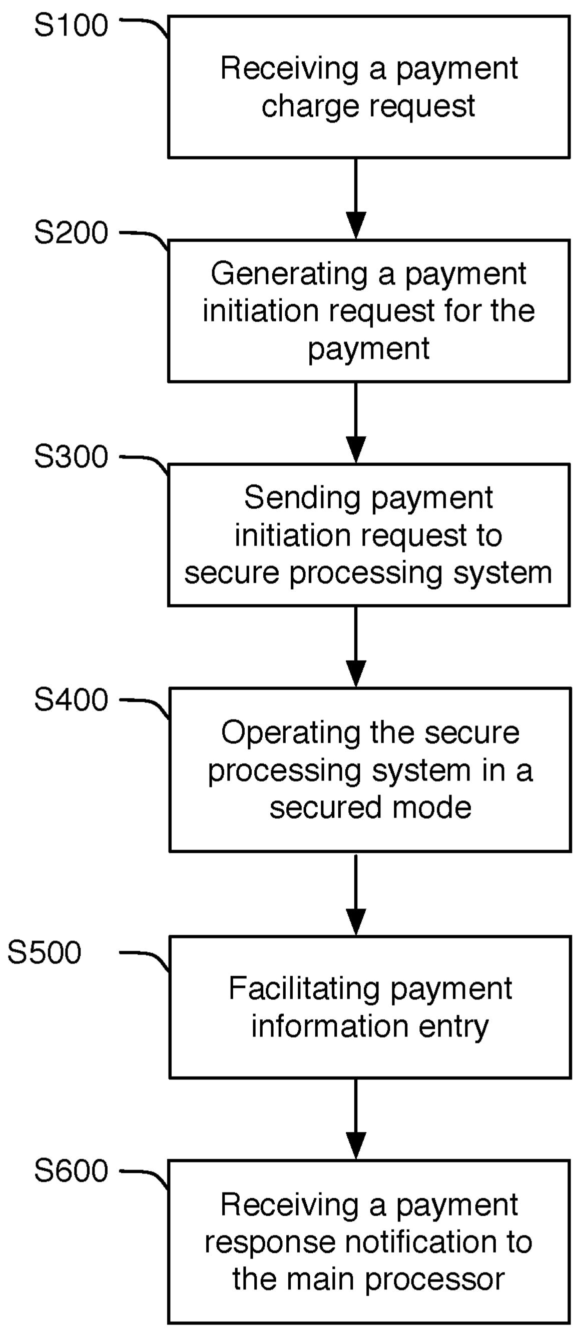
FIG. 3 is a schematic representation of the method of payment terminal operation.

As shown in FIG. 3, the method of payment terminal operation includes receiving a payment collection request from an application S100, generating a payment initiation request for the payment S200, sending the payment initiation request to a secure processing system S300, switching the secure processing system from an unsecured mode to a secured mode in response to receipt of the payment initiation request S400, facilitating payment information entry S400, and receiving a payment response notification, generated based on the payment information, at the main processor S600.

The method functions to enable both standard-compliant payment processing and non-standard compliant functionalities. In particular, the method functions to process sensitive payment information in a standard-compliant manner, while extracting non-sensitive, payment-related information from the transaction. The method can additionally provide software module access (e.g., feature or application access) to the non-sensitive information. The non-sensitive information is preferably payment information, but can alternatively be customer information (e.g., traffic information, purchase histories, etc.), financial information, or any other suitable information. The software module is preferably provided substantially unrestricted software module interaction with the non-sensitive information on the singular payment terminal, wherein the modules can be capable of freely reading, writing, editing, deleting, or otherwise interacting with all or some of the memory and processes connected to or supported by the main processor. However, the software module can have any other suitable permissions. The software module can be an operating system feature, an application (e.g., native application on the device, web browser applications, native application on a remote device or payment terminal, etc.) with multiple integration points, an application with limited or restricted integration points, or any other suitable software module. In a specific variation, the method enables these functionalities by substantially isolating sensitive information processing from non-sensitive information processing on a singular payment terminal.

1. System.

Figure 1:
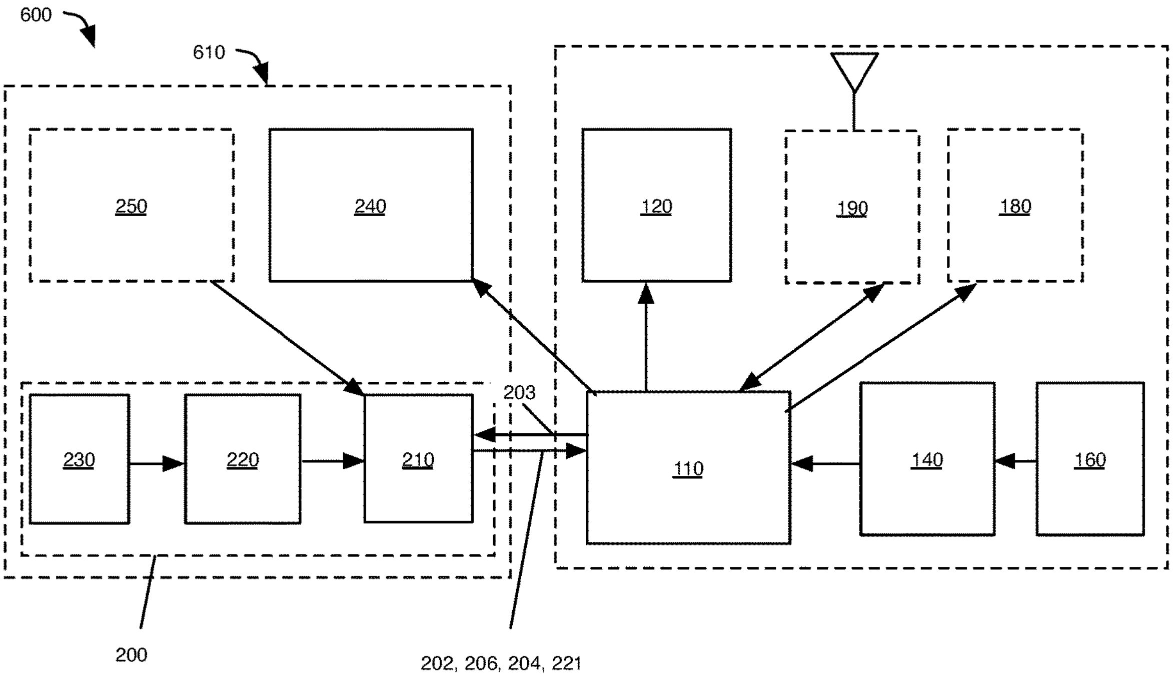
FIG. 1 is a schematic representation of the payment terminal components operating in an unsecured mode.

The method is preferably performed with a payment terminal 600, as shown in FIG. 1, that includes a secure processing system 200 separate and distinct from a main processor 110 (first processor), wherein the secure processing system 200 can include a secure input device 230 (first input device) and a secure processor 210 (second processor), and the main processor 110 can be connected to a secure display 240 (first display) associated with the secure input device 230. The secure processing system 200 can additionally include a secure input processor 220 (first input processor, first secure input processor) connected to the secure input device 230. The secure processing system 200 is preferably operable between a secured mode and an unsecured mode, but can alternatively be operable between any other suitable set of modes. All or a subset of the secure processing system components can be operable in the secured and unsecured mode, wherein the components can operate independently of other secure processing system components. In the unsecured mode, the secure processing system 200 can send unsecured input information received from a secure input device 230 to the main processor 110 in the unsecured mode, wherein the main processor 11 processes the inputs based on the display element concurrently displayed on the secure display 240 during input receipt at the secure input device 230. In the secured mode, the secure processing system 200 can process the inputs received at the secure input device 230 based on the display elements known or anticipated to be concurrently displayed on the secure display 240 during input receipt. The secure processing system 200 can additionally generate data based on the processed inputs, secure the data, and send the secured data to the main processor in the secured mode. However, the secure processing system 200 can operate in any other suitable manner in the secured mode.

The secure input processor 220 can be operable between a secured mode and an unsecured mode, wherein the secure input processor selectively connects the secure input device to the secure processor and selectively disconnects the secure input device 230 from the main processor 110 in the secured mode, and selectively connects the secure input device 230 to the main processor 110 and selectively disconnects the secure input device 230 from the secure processor 210 in the unsecured mode.

The secure processor 210 is preferably operable between a secured mode and an unsecured mode, but can alternatively be operable in the secured mode at all time. The secure processor can secure (e.g., encrypt, obfuscate, etc.) all information 204 communicated to the main processor 110 (e.g., sent, transmitted, broadcast, etc. to the main processor 110), secure only a subset of information (e.g., information satisfying a first set of conditions) prior to communication to the main processor, or secure any suitable set of information in the secured mode. In the second variation, the secure processor 210 can additionally communicate unsecured information satisfying a second set of conditions to the processor while operating in the secured mode. The first set of conditions can include: information that is received from a predetermined set of sources (e.g., receiving the information from a secure side NFC system); substantially matching patterns in the information with a set of predetermined patterns; or any other suitable set of conditions. The patterns can be alphanumeric patterns, bit patterns, magnetic field patterns, or any other suitable pattern. The patterns can be established by standards, such as ISO/IEC 7816-5, ISO/IEC4909: 2006, learned (e.g., from historical information receipt associated with information categorization by a user, such as the merchant or customer), or otherwise determined. The second set of conditions can be: failing the first set of conditions, substantially matching a second set of patterns, or any other suitable set of conditions. In the unsecured mode, the secure processor preferably forwards unsecured input coordinates received from the secure input processor to the main processor, but can alternatively or additionally forward any other suitable information to the main processor. Alternatively or additionally, the secure processor can prevent, substantially hinder, or halt input coordinate communication to the main processor in the secured mode, and can communicate input signals 231 from the secure input device 230 to the main processor 110 in the unsecured mode. The secure processor 210 can additionally generate notifications 202 that function to communicate events (e.g., payment events, card insertion events, user input events, etc.) to the main processing system 100.

Figure 20:
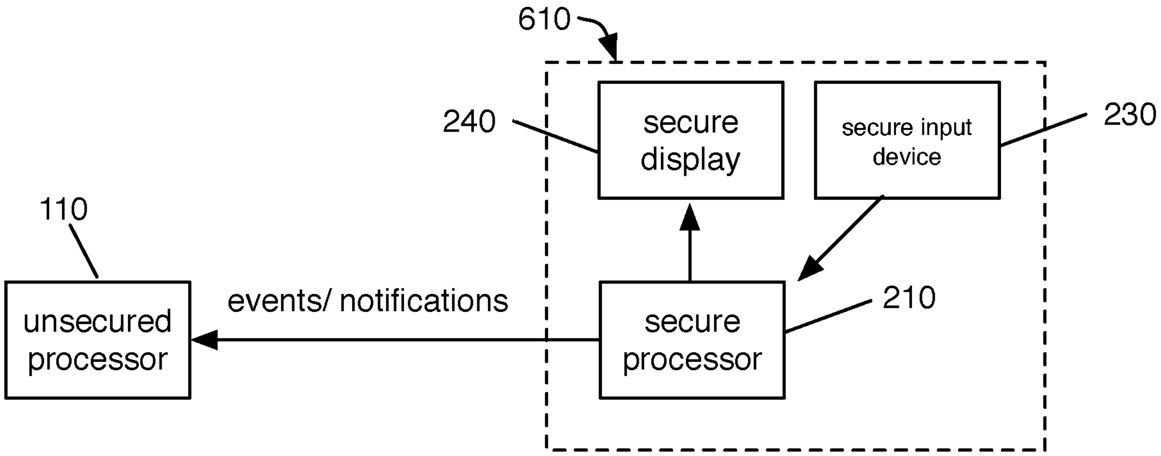
FIG. 20 is a schematic representation of a variation of the payment terminal including a secure processor operatively connected to both the secure display and the secure input processor and/or secure input device.
Figure 21A:
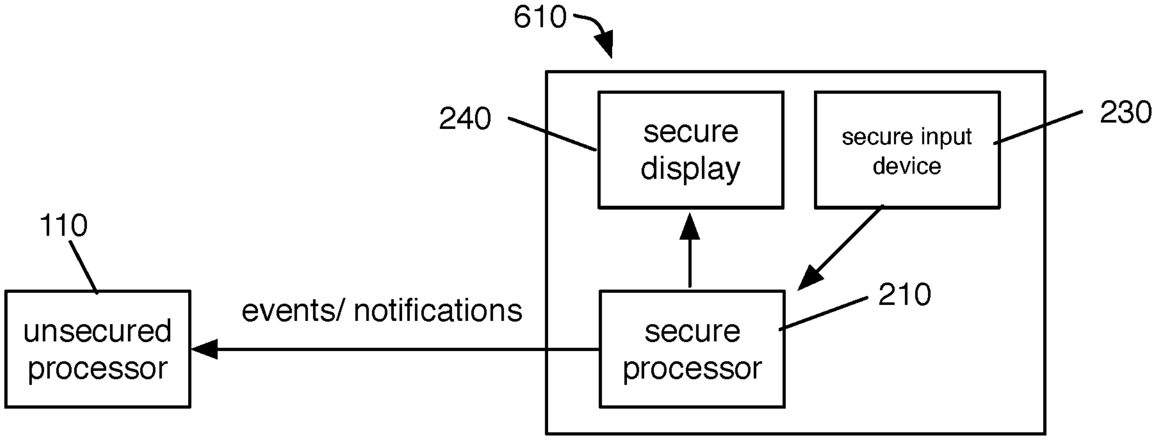
FIGS. 21A and 21B are schematic representations of a variation of the payment terminal with a secure processing system operating in the secured mode, wherein the secure processor can control the secure display, and the secure processing system operating in the unsecured mode, wherein the secure processor enables secure display control by the unsecured processor, respectively.
Figure 21B:
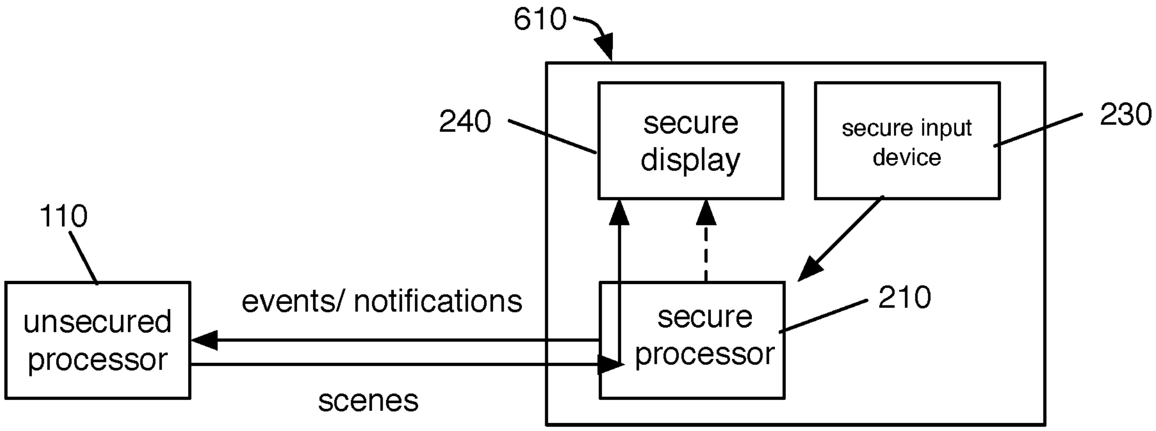

In one variation, the secure processor 210 is disconnected from the secure display 240, wherein the secure processor 210 interprets input coordinates received from the secure input processor based on a coordinate map associated with a display element requested for display from the main processor (e.g., wherein the display element actually concurrently displayed at the secure display is unknown by the secure processor). In a second variation, the secure processor 210 is connected to and controls the secure display 240, wherein the secure processor 210 interprets input coordinates received from the secure input processor based on a coordinate map associated with a display element displayed by the secure processor 210 on the secure display 240 (e.g., as shown in FIG. 20. In a third variation, the secure processor 210 controls secure display operation by halting main processor 110 control of the secure display 240 when in the secured mode (e.g., by disconnecting the main processor 110 from the secure display 240), and permitting main processor 110 control of the secure display 240 in the unsecured mode (e.g., as shown in FIGS. 21A and 21B, respectively). However, the secure processor can be otherwise connected to the terminal components.

Figure 23:
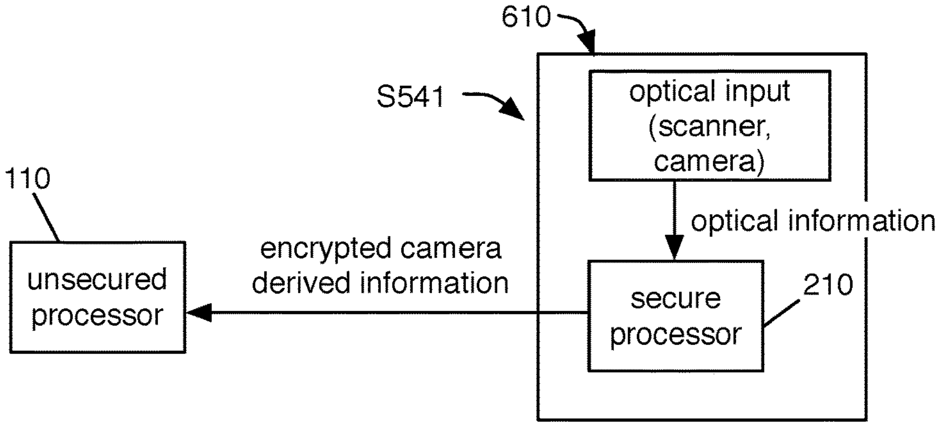
FIG. 23 is a schematic representation of a variation of the payment terminal capable of receiving information from an optical sensor, wherein the secure processor processes the optical information received from the optical sensor and sends events, notifications, and/or the optical information, encrypted, to an unsecured processor.

The secure processor 210 is preferably disconnected from sensors (e.g., wherein the sensors can be connected to the main processor 110), but can alternatively be connected to sensors (e.g., wherein the sensors can be connected to the secure processor 210 only or also be connected to the main processor 110). In one variation, the secure processor 210 can be connected to a set (e.g., one or more) of optical sensors, wherein the secure processor 210 can determine payment information or other optical information from the measured image, as shown in FIG. 23. The optical device can be a camera (e.g., a CCD camera), scanner (e.g., barcode scanner), or any other suitable optical sensor. Alternatively, the sensor can be an audio sensor, light sensor, or any other suitable sensor.

Figure 22:
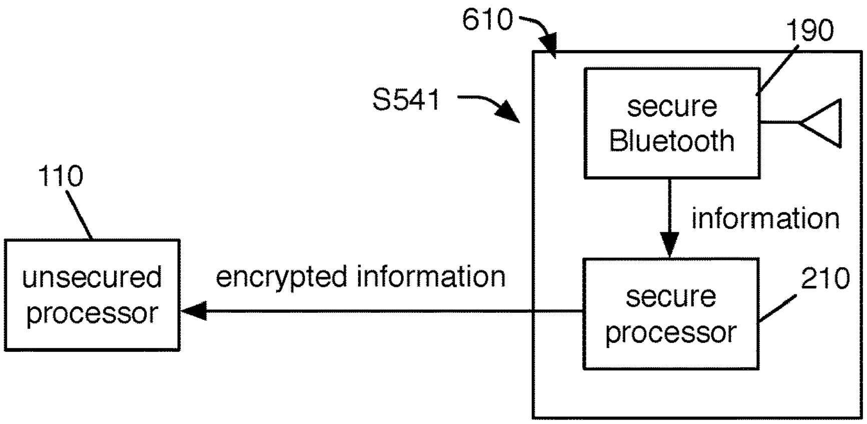
FIG. 22 is a schematic representation of a variation of the payment terminal capable of receiving information from a Bluetooth connection, wherein the secure processor processes the information received from the Bluetooth connection and sends events, notifications, and/or the information, encrypted, to an unsecured processor.

The secure processor 210 is preferably disconnected from wireless communication modules, but can alternatively be connected to the wireless communication modules. In one variation, the secure processor 210 can be connected to an NFC transceiver, wherein the secure processor can communicate information over the NFC connection from a second NFC system (e.g., a user device), and can additionally process the information, secure the information, and send the information to an unsecured system (e.g., the main processor 110). In a second variation, as shown in FIG. 22, the secure processor 210 can be connected to a Bluetooth transceiver (e.g., BLF, Bluetooth 2.0, etc.), wherein the secure processor can communicate information over the Bluetooth connection from a second Bluetooth system (e.g., a user device), and can additionally process the information, secure the information, and send the information to an unsecured system (e.g., the main processor 110). However, the secure processor 210 can be connected to any other suitable communication modules.

The secure input device 230 preferably operates in a secured mode at all times, but can alternatively be operable between a secured mode, wherein the signals output by the secure input device are obfuscated or otherwise secured (e.g., wherein the receiving processor includes a complimentary key or pattern to unsecure the signals), and an unsecured mode, wherein signals output by the secure input device are unobfuscated or unsecured. However, the secure processing system can operate between the secured and unsecured modes in any other suitable manner.

The payment terminal 600, more preferably the secure processing system 200 but alternatively the main processor 110, can additionally include a set of payment hardware 250 (financial transaction information input), such as NFC communication modules, card readers (e.g., magnetic stripe readers, IC chip readers, etc.), cameras, or other information inputs that function to read, extract, or otherwise determine payment instrument data from payment instruments 700 (e.g., payment cards, secure elements, etc.). The payment hardware 250 is preferably connected to and controlled by the secure processor 210, but can alternatively be connected to the main processing system 100 or any other suitable component. The payment terminal 600 can additionally include a main display 120 (second display), a main input device 160 (second input device) associated with the main display 120, and/or a main input processor 140 (second input processor) configured to interpret signals from the main input device 160 for the main processor 110. Signals received at or measured by an input device can be interpreted in light of the interface (e.g., image, dynamic interface, etc.) that is actually or anticipated to be concurrently displayed on the respective display during signal receipt. However, the signals can be interpreted in any other suitable manner. The payment terminal 600 can additionally include peripheral devices 180, such as printers, registers, or any other suitable peripheral device. The main processor 110 is preferably connected to and controls the peripheral device 180, but the secure processor 210 or any other suitable component can alternatively be connected to and/or control the peripheral device 180. The payment terminal 600 can additionally include one or more communication modules 190 that function to communicate information to or from the payment terminal 600. The communication module 190 can be a transceiver, receiver, or transmitter. The communication module 190 can include a WiFi module, NFC module, Bluetooth module, Ethernet module, or any other suitable module.

The main processor 110 can be a processor enclosed within the same housing as the secure processor, a processor of a peripheral device, a processor of a user device (e.g., wherein the secure side can be substantially self-contained), or be any other suitable processor. The main processor 110 can include a secure processing module 130 that functions to control communication between the main processor 110 and secure-side elements. In particular, the secure processing module 130 can control secure display operation, send and/or receive information to/from the secure processor 210, or control information transfer between the main processor 110 and secure-side elements in any other suitable manner. The secure processing module 130 can be a kernel, chip, or other processing module. The secure processing module 130 is preferably separate and distinct from other kernels, chips, or processing modules of the main processor of similar type, but can alternatively be integrated with other processing modules of similar type. The secure processing module 130 is preferably payment or security standard-certified or standard-compliant (e.g., PCI-certified), but can alternatively be uncertified or have any other suitable certification.

The secure processing module 130 preferably includes a payment resource 132, a secure display resource 134, and a secure communication resource 136, but can additionally or alternatively include any other suitable resource. The payment resource 132 can be configured to orchestrate the payment flow, including receiving an initiation request, generating the payment initiation request 203, sending the payment initiation request to the secure communication resource 136, and generating a display command specifying which of a predetermined set of display elements to display on the first display for the secure display resource 134. The payment resource 132 can additionally or alternatively be configured to receive information from the secure communication resource 136, send information to a communication resource (e.g., a wireless communication resource), receive information from a communication resource, extract information (e.g., non-sensitive information) from the communicated information, deactivate the payment initiation request 203, and/or perform any other suitable functionality.

The secure display resource 134 functions to display an image on the secure display. The secure display resource 134 is preferably operatively connected to the secure display, and is configured to display an image on the secure display specified by the payment resource 132, the secure processor, or by any other suitable component. The secure display resource 134 is preferably separate and distinct from the payment resource 132, but can alternatively be an integral component of the payment resource 132. In a first variation, the secure display resource 134 is controlled solely by the payment resource 132. In a second variation, the secure display resource 134 is controlled by the payment resource 132 and the secure processor. However, the secure display resource 134 can be otherwise controlled. The secure display resource 134 is preferably configured to display one of a predetermined set of display elements 242 (e.g., scenes, interfaces), but can alternatively display a display element received from or specified by the instructing component (e.g., payment resource 132, secure processor, etc.) or display any other suitable display element. The predetermined set of display elements is preferably a fixed set (e.g., the set constitution does not change) but can alternatively be a dynamically alterable set (e.g., alterable by an entity having write permissions), or have any other suitable characteristic. The predetermined set of display elements can include a number pad (e.g., PIN pad), cart, payment prompt (e.g., “Insert card,” “Tap card,” etc.), signature, welcome screen, advertisement screen, or any other suitable display element. Each display element can have a single, standardized version (e.g., wherein the standard appearance functions as a user indicator of security), or can have multiple variants. All or parts of the display elements can be static (e.g., have a fixed layout or a fixed, predetermined touch coordinate to display pixel mapping that corresponds to the coordinate maps 244 stored by the secure processor 210) or dynamic (e.g., editable). The selectable or input portions of the display elements (e.g., number pad, option selection icons, etc.) are preferably static and the output portions of the display elements (e.g., portions of the display element providing selection feedback to the user) are preferably dynamic, but the input portions can alternatively be dynamic and/or the output portions can alternatively be static. Each display element can include a coordinate map 244 that functions to map input coordinates 221, determined by the respective input processor, to portions of the display element 242.

Figure 16:
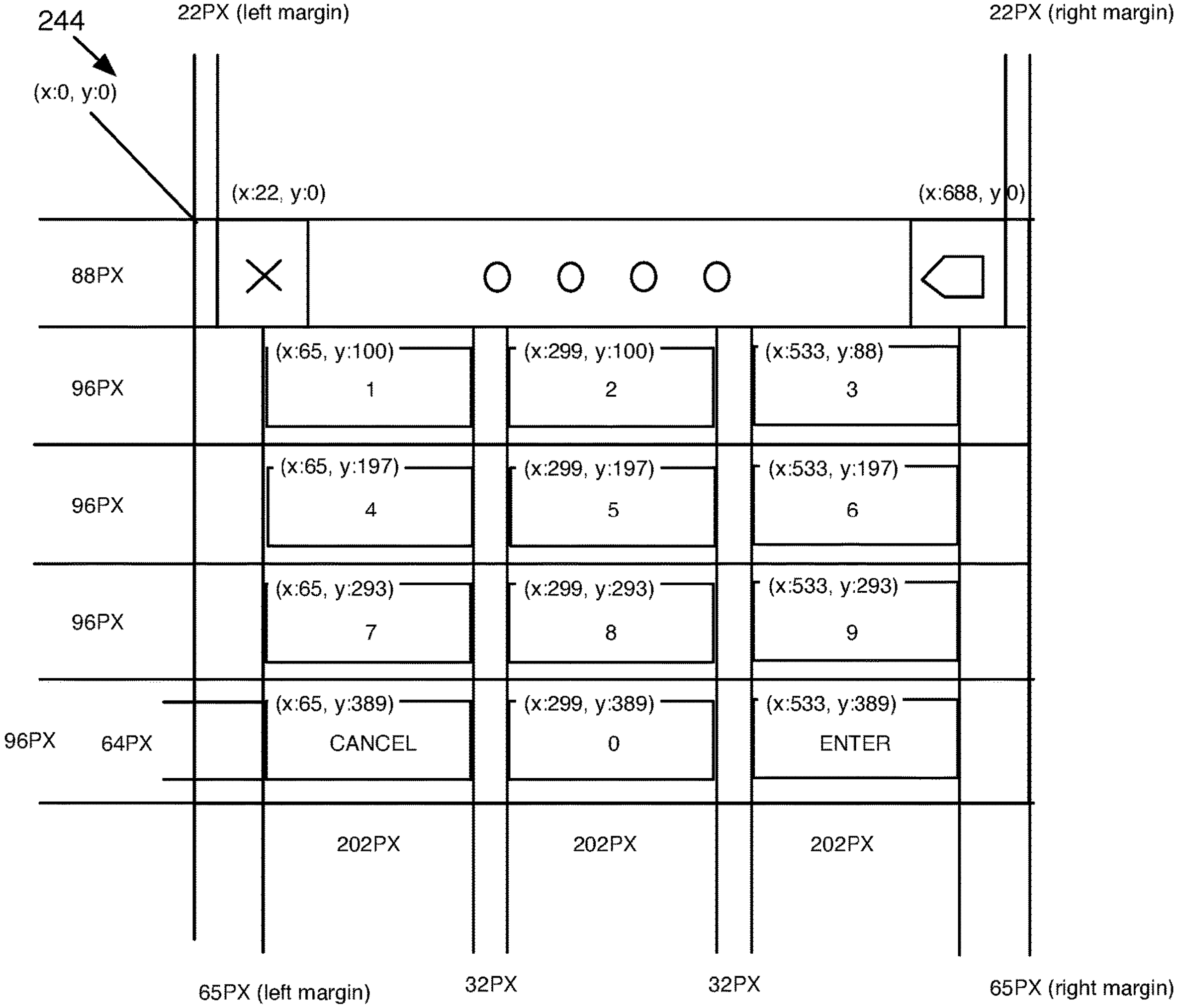
FIG. 16 is a schematic representation of a specific example of a coordinate map for a PIN number pad.

In one example, the PIN pad can include a first, fixed portion defining the number pad, and a second, dynamic portion defining an output portion, wherein predetermined icons appear in the dynamic portion in response to receipt of user input at a portion of the respective input device associated with the first, fixed portion. The first, fixed portion of the number pad is preferably associated with a predetermined set of input coordinates by a touch coordinate map. More preferably, each number of the number pad is associated with a discrete set of input coordinates. However, input signals can be mapped to the number pad in any other suitable manner. An example of a coordinate map 244 for a PIN pad to be displayed on the secure display 240 is shown in FIG. 16.

Figure 9:
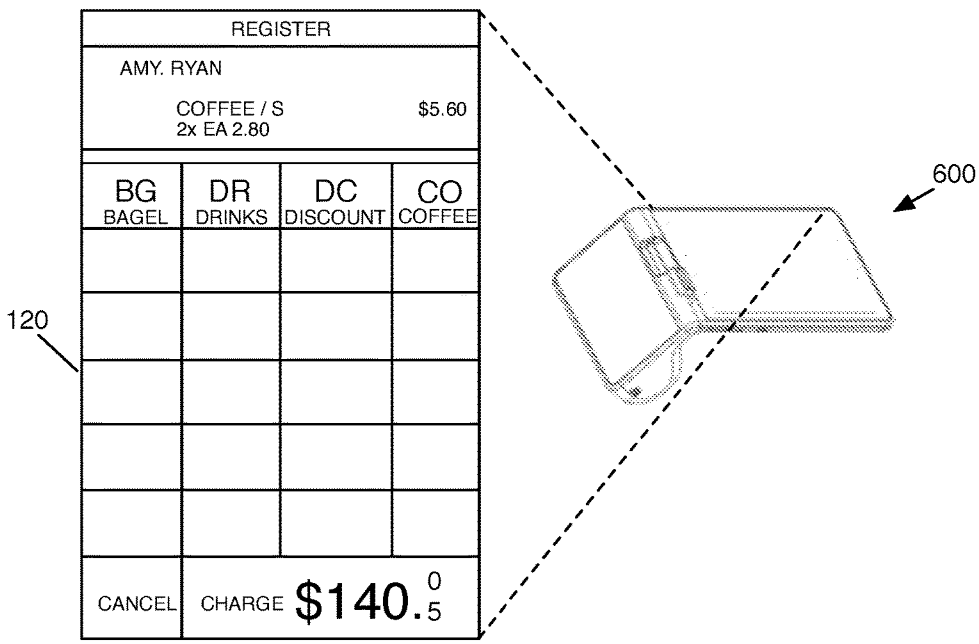
FIGS. 9 and 10 are schematic representations of an example of concurrently displaying product representations on a first and second cart display element on the main and secure displays, respectively.
Figure 10:
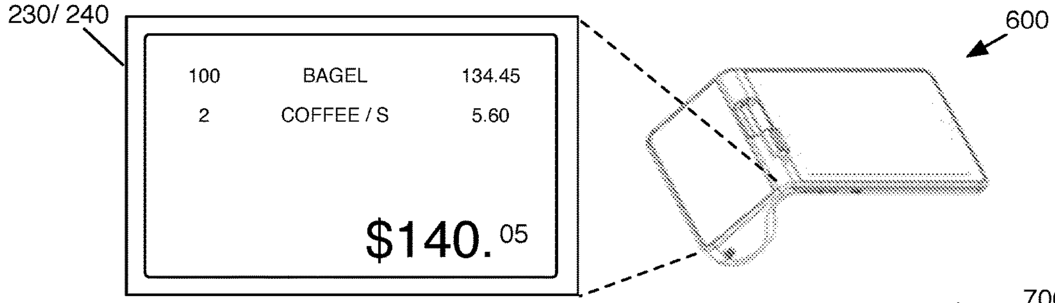

In a second example, as shown in FIG. 10, the cart can include a window that dynamically changes to displays product descriptions in response to product identifier entries. The product identifier entries can be received by the application (e.g., in response to user selection, a product scan, etc.) and communicated to the payment resource 132, wherein the payment resource 132 can retrieve the product descriptions associated with the product identifiers from the product resource and control the secure display resource 134 to display the product descriptions. The payment resource 132 can additionally or alternatively instruct the main display 120 to substantially concurrently display the same or related product descriptions (shown in FIG. 9). Alternatively, the payment resource 132 can send the product identifiers to the secure display resource 134, wherein the secure display resource 134 automatically retrieves the product descriptions from a product resource that associates the product identifier with the product descriptions. However, the product descriptions can be presented in a virtual cart in any other suitable manner.

In this example, the method can additionally include verifying product inventory with an inventory resource, wherein the payment resource 132, product resource, or other resource verifies that the inventory of the identified product that is associated with the merchant over a predetermined threshold (e.g., more than 0). The product inventory is preferably verified before the product description is displayed in the cart, but can alternatively be verified after the product description is displayed in the cart (e.g., after the payment flow has been initiated), or verified at any other suitable time. In response to determination that the instantaneous or anticipated inventory of the identified product is below the threshold, the system can automatically generate and transmit an out of stock event or a low inventory event. In response to second application receipt of the out of stock event or low inventory event, the second application can automatically place an order to replenish the inventory or take any other suitable action based on the out of stock event or low inventory event.

In a specific variation, the secure display resource 134 is limited to displaying display elements from the predetermined set of display elements. In a second specific variation, the secure display resource 134 can display any display element received from the secure processor, wherein the secure processor can store or generate display elements and send the display element to the secure display resource 134. In a third specific variation, the secure display resource 134 can display any display element received from the payment resource 132, wherein the payment resource 132 can select the display element from a predetermined set of display elements, receive the display element from an application, generate the display element, or otherwise determine the display element. When the display element is outside of the predetermined set of display elements, the payment resource 132 and/or secure display resource 134 can additionally analyze the requested display element for specific features associated with sensitive information entry (e.g., number pad patterns, etc.), and selectively limit display of display elements having the features. Alternatively or additionally, display of certain display elements or features can be selectively permitted or disabled in different operation modes or payment initiation request states. For example, display of a PIN pad or display element having number pad features can be enabled in the secured mode, but disabled in the unsecured mode. In another example, display of a PIN pad or display element having number pad features can be enabled when a payment initiation request is active, but disabled when the payment initiation request is disabled or when no payment initiation requests are concurrently active on the terminal. However, the secure display resource 134 can be otherwise operated.

Figure 2:
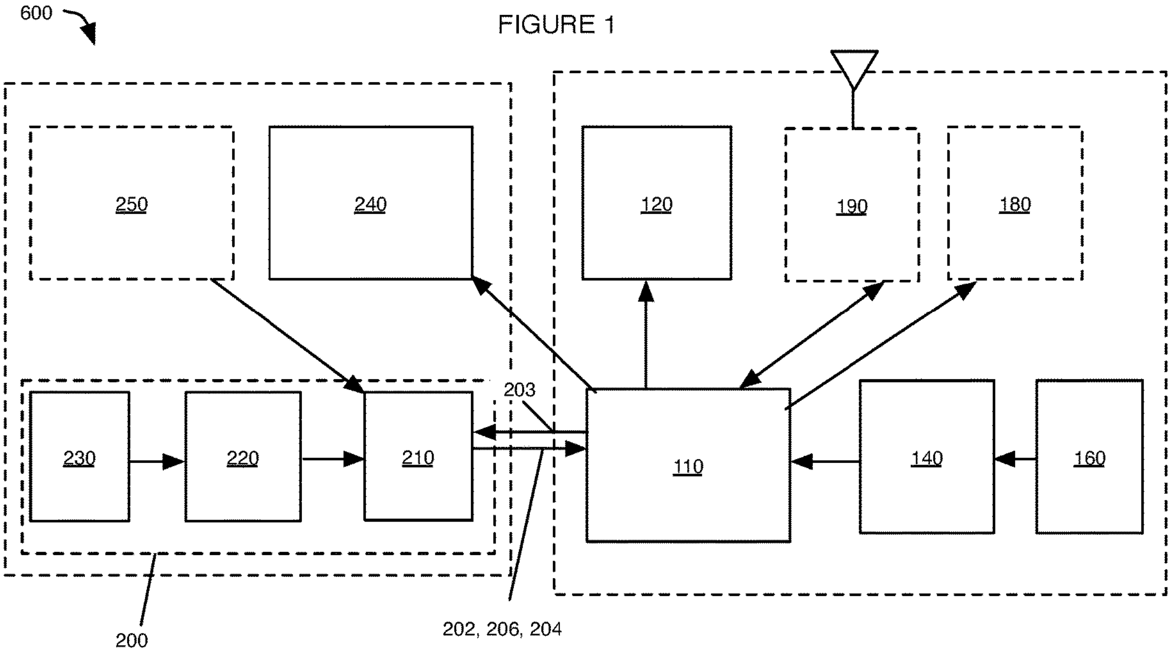
FIG. 2 is a schematic representation of the payment terminal components operating in a secured mode.

The secure communication resource 136 functions to communicate data with the secure processing system. The secure communication resource 136 can communicate information to the secure processor, receive information from the secure processor, communicate information to the secure input processor, and/or receive information from the secure input processor. The secure communication resource 136 can be selectively connected to some components, and disconnected from others. In a first variation, the secure communication resource 136 is connected to the secure processor with only a one-way communication channel (e.g., a data connector that only transfers data from the secure processor to the secure communication resource 136), wherein the secure communication resource 136 can be connected to the secure input processor with a one-way communication channel (e.g., wherein the secure communication resource 136 can only send information to and not receive information from the secure input processor) or two-way communication channel. In a second variation, the secure communication resource 136 is connected to the secure input processor with only a one-way communication channel (e.g., a data connector that only transfers data from the secure communication resource 136 to the secure input processor), wherein the secure communication resource 136 can be connected to the secure processor with a one-way communication channel (e.g., wherein the secure communication resource 136 can only receive information from the secure processor) or two-way communication channel. The secure processing system output is preferably only connected to the secure communication resource 136. Alternatively or additionally, the secure input processor auxiliary processor input can be connected to only the secure communication resource 136, while the secure input processor auxiliary processor output can be connected to the secure communication resource 136 and/or a secondary main input processor supported by or separate and distinct from the main processor 110, as shown in FIG. 2.

In a specific example, the secure communication resource 136 can transfer the payment initiation request from the payment resource 132 to the secure processor. In a second specific example, the secure communication resource 136 can transfer the display request to the payment resource 132 from the secure processor. In a third specific example, the secure communication resource 136 can communicate payment information, more preferably secured payment information, from the secure processor to the main processor 110 (e.g., for remote verification). The secured payment information can be associated (e.g., tagged) with unsecured auxiliary information (e.g., metadata), which the main processor or remote system can extract and utilize. For example, the unsecured information can include an endpoint (e.g., a payment entity), a transaction identifier 30, customer information, merchant information, order information, compression instructions, or any other suitable information. Alternatively, the main processor can associate the secured payment information with the aforementioned information. However, the secure communication resource 136 can operate in any other suitable manner. The secure communication resource 136 is preferably separate and distinct from the secure display resource 134 and/or the payment resource 132, but can alternatively be an integral component of the secure display resource 134 and/or the payment resource 132. The secure communication resource 136 preferably connects the secure processor to the main processor 110, more preferably the secure processor to the secure processing module 130 of the main processor 110, but can alternatively connect any other suitable component of the main processor 110 to the secure processor. Alternatively or additionally, the secure communication resource 136 can control operation of the connection between the main processor 110 and the secure processor (e.g., the USB or other power and/or data connections connecting the main processor 110 and secure processor). In one variation, the secure communication resource 136 only connects the payment resource 132 to the secure processor. However, the secure communication resource 136 can connect multiple sources to the secure processor or be otherwise configured.

The payment terminal can additionally include a second secure input processor 222, connected to the main processor and selectively connected to the first secure input processor, that functions to receive input coordinates from the first secure input processor. Additionally or alternatively, the second input processor can be connected to the secure input device and function to receive and interpret input signals into input coordinates for main processor use. However, the second secure input processor can function in any other suitable manner.

Figure 17:
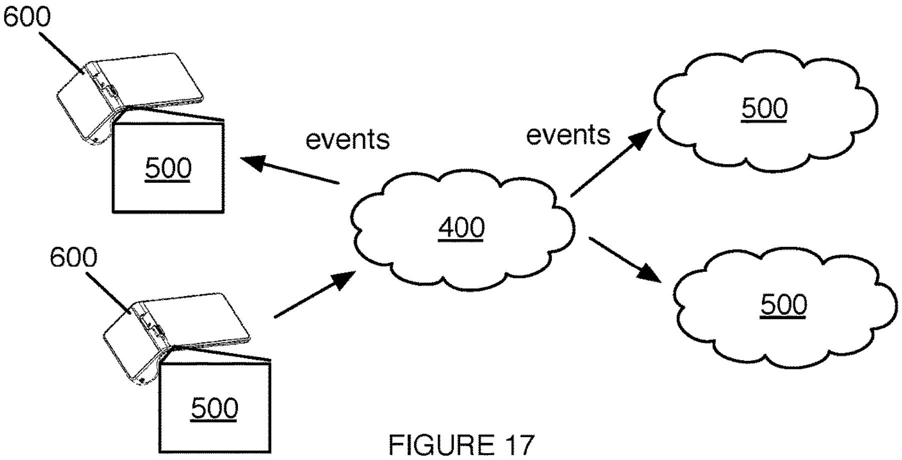
FIG. 17 is a schematic representation of event and/or notification broadcasting between a set of payment terminals, a remote system, and a set of applications.

The payment terminal 600 can additionally include a transaction resource that functions to store and provide past transaction-associated information. Transaction-associated information can be any information associated with a transaction identifier, such as order information, transaction information, or any other suitable information. Order information 40 can include transaction information, cart or product information (e.g., product identifier, number of each product, etc.), customer identifiers, order status (e.g., completed, open, paid but not picked up, etc.), merchant identifiers, employee identifiers, or any other suitable order information. Transaction information can include a transaction identifier, transaction amount, merchant information, customer identifier, payment type, terminal identifier, and/or any other suitable information about the transaction. The transaction identifier can be universally unique, unique to the merchant, unique to the customer identifier, generic, or be defined in any other suitable manner. The transaction resource can store all transaction-associated information associated with one or more merchants, employees, customers, payment terminals 600, or any other suitable identifier, a portion of the transaction-associated information, or any other suitable set of information. The transaction-associated information is preferably non-sensitive information, but can alternatively be sensitive information. The transaction-associated information can additionally include customer information. Alternatively, customer information can be managed and stored by a separate resource. Customer information can include loyalty information, the number of times the customer has entered a store (e.g., based on a unique customer identifier, such as a mobile phone identifier received when the mobile phone connects with a wireless network associated with the merchant, such as a WiFi network), customer signature, customer identifier, customer purchase history, customer perusal history, or any other suitable customer information. The transaction resource can be supported by a remote computing system (e.g., a set of servers, a set of networked payment terminals 600, etc.), the payment terminal 600 facilitating the transactions (e.g., the main processor 110 of the payment terminal 600), and/or by any other suitable system. Transaction-associated information is preferably generated by the remote system 400 (e.g., wherein the remote system is a party to completion of the transaction), but can alternatively or additionally be generated by the payment terminal 600 or generated by any other suitable source. When the transaction-associated information is stored by both the remote system and the payment terminal (s) 600, the remote system can function as the master and the payment terminals 600 function as the slave, wherein the payment terminals 600 can be synchronized with the remote system at a predetermined frequency, as shown in FIG. 17. Applications 500 and/or the payment terminals 600 preferably request transaction-associated information from the remote system, but can alternatively request the transaction-associated information from a payment terminal 600 running the application, or from any other suitable source. However, storage source priorities can be assigned in any other suitable manner. Transaction resource access can be limited to a predetermined set of merchant identifiers, user identifiers, payment terminal identifiers, applications associated with one or more predetermined merchant identifiers, unlimited, and/or be associated with any other suitable set of permissions. Transaction resource access can include requesting information from the transaction resource, wherein the transaction resource sends the transaction information associated with the transaction identifier back to the requesting system; editing or deleting transaction information within the transaction resource; creating transaction information within the transaction resource (e.g., creating a new order associated with a new transaction identifier), or otherwise interacting with transaction-associated information. The identifiers can uniquely identify the respective entities (e.g., the merchant identifier uniquely identifies the merchant, the payment terminal identifier uniquely identifies the terminals, etc.), be shared identifiers (e.g., wherein two different merchant identifiers can be associated with the same employee identifier, each associated with a different employee), or be any other suitable identifier.

The payment terminal 600 can additionally include a product resource that functions to define the products associated with the merchant. The product resource can associate an internal product identifier with a merchant product identifier (e.g., SKU), full product description, short product description, product supplier, and/or any other suitable product-associated information. The product resource can be associated with and/or include a pricebook resource, wherein the pricebook resource associates a product identifier with a product price. The product resource can be associated with and/or include a catalog resource, wherein the catalog resource associates a product identifier with a category of products (e.g., associates an "apple" product with a "produce" category). The product resource is preferably stored by the remote system, but can alternatively or additionally be stored locally on the payment terminal 600 or on any other suitable system. The product resource can be used by applications to generate icons, retrieve product-associated information, or used in any other suitable manner. The product resource can be used by other resources, such as the secure display resource 134, to fill in dynamically adjustable fields in certain interfaces (e.g., the cart interface). However, the product resource can be used in any other suitable manner. The product resource can be predetermined, created by an application on the payment terminal 600, created by the payment terminal 600, created by an application running on a remote device (e.g., a web application), or created in any other suitable manner. Products within the product resource can be referenced, edited, created, updated, deleted, or otherwise interacted with by an application running on a payment terminal 600, an application running on a remote device (e.g., wherein the application or remote device can be associated with a merchant identifier or employee identifier), a second resource, or any other suitable system. However, the system can additionally or alternatively include any other suitable resource, located locally at the payment terminal 600 or remotely at the remote system.

Figure 24:
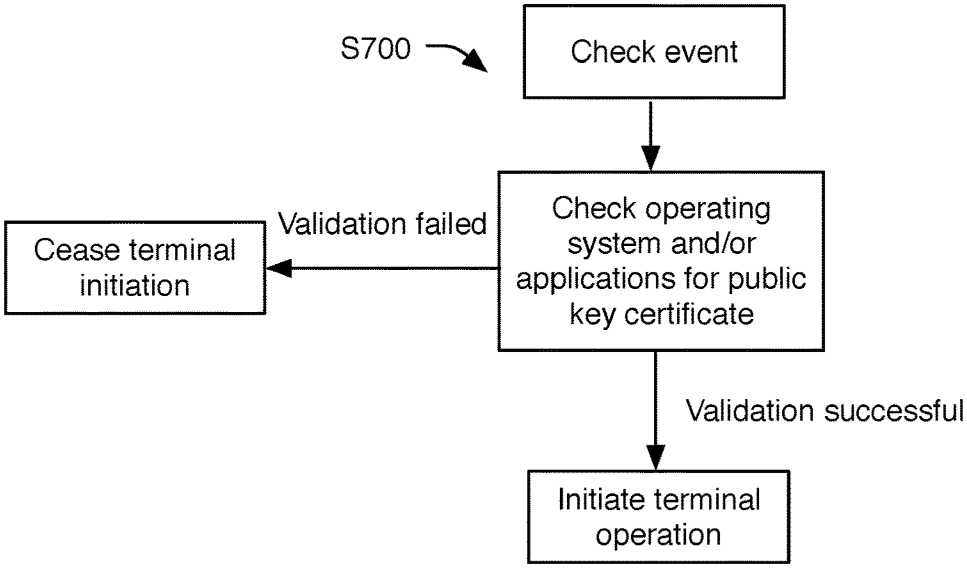
FIG. 24 is a schematic representation of a variation of the method including verifying the operating system and/or applications in response to the occurrence of a check event.

The payment terminal can additionally store a set of public key certificates that are used to verify the operating system and/or applications running on the payment terminal. The public key certificates are preferably flashed to the payment terminal, more preferably the main processor but alternatively the secure processor or any other suitable terminal component during manufacture, but can alternatively be stored on the payment terminal at any other suitable time. As shown in FIG. 24, the payment terminal can verify or validate the operating system and/or application with the public key certificate (e.g., include validating the operating system and/or application S700) at a predetermined frequency, upon the occurrence of a predetermined event (e.g., terminal power on, user login, etc.), or in response to any other suitable event. The payment terminal preferably permits operating system and/or application use in response to respective validation, and prevents operating system and/or application use (e.g., halt the startup process) in response to validation failure. This can require the operating system and/or any applications to be signed and/or certified by the certificate authority generating the public key certificates.

In one variation, the method can be performed by the payment terminal 600 disclosed in U.S. application Ser. No. 14/526,033, filed Oct. 28, 2014, titled "Payment terminal system and method of use," incorporated herein in its entirety by this reference. The method can additionally or alternatively be performed by a remote system, such as a set of servers or other computing systems. However, the method can be performed by any other suitable system.

2. Benefits.

The payment terminal and method of operation can confer several benefits over conventional payment terminals. First, variants of the payment terminal can enable dynamic module adjustment (e.g., flexible application installation, data import, data export) on the system while maintaining standard compliance. These variants can do so by including a secure processor that is separate from a main processor. The secure processor is standard-certified and handles sensitive payment information (e.g., information required to make a digital payment), while the main processor supports the modules and can be dynamically modified without influencing secure processor functionality. In a specific example, third party applications can be installed, operated, or uninstalled on the main processor by the merchant without re-certifying the entire payment terminal.

Second, variants of the payment terminal can enable third-party access to merchant order, transaction, and/or payment information by functioning as an intermediary between a secure transaction processing component (the secure processor) and a payment gateway. In particular, the main processor can extract and/or obtain non-sensitive information about the customer and/or transaction substantially concurrently with or immediately after the transaction, wherein the non-sensitive information can subsequently be used by the system or a third party to perform a secondary function. In a specific example, the main processor can determine that a transaction occurred and identify the items associated with the transaction, wherein the system or a third party application can update an inventory list by removing the items associated with the transaction. In a second specific example, the main processor can extract a transaction amount from the transaction, wherein the system or a third party application can update accounting records with the transaction amount.

Third, variants of the payment terminal can enable a singular input system (e.g., touchscreen) to receive and process both secure information (e.g., payment information) and non-secure information (e.g., signature data, email addresses, drivers license information, etc.) from a user. In doing so, the system enables a seamless user experience, wherein the user only needs to interact with the single input system to enter both sensitive information and non-sensitive information in the same payment flow. In these variants, the payment terminal can automatically determine when sensitive information will be entered or whether the entered information is sensitive information, and automatically send the information to the proper destination.

Fourth, the specific configurations of some payment terminal variants can reduce or eliminate security breaches. In a first example, security attacks at the touchscreen level can be reduced or eliminated by obfuscating the touch measurements (e.g., introducing noise into the measurement), using mutual capacitance technology (e.g., the touch system provided by Cirque™), or reduced in any other suitable manner, wherein the secure input processor (e.g., secure touch processor) unobfuscates or otherwise interprets the touch measurements to touch coordinates.

In a second example, security attacks at the secure processor level can be mitigated by splitting control of the secure display and the secure input. In particular, in some variants of the payment terminal, the main processor controls the secure display substantially independently of secure processor input receipt, such that the secure processor receives inputs without absolute knowledge of the image or interface that was concurrently displayed on the secure display.

In a third example, some variants of the payment terminal can prevent unsecured, sensitive information acquisition by the main processor (e.g., receiving a PIN number while in the unsecured mode by displaying a calculator or other number pad) by limiting the images or interfaces that can be displayed on the secure display to a predetermined set of images or interfaces. Access to the secure display can be further limited by confining secure display control to a secure display resource (secure display service) digitally or physically isolated from the remainder of the main processor. The secure display resource can be supported by a separate kernel from those supporting third party applications, by a separate processor, or isolated in any other suitable manner. In some payment terminal variants, the secure display resource can only be controlled by a payment service or run autonomously, wherein the payment service can be limited to controlling the secure display resource only when a payment is initiated, or when another predetermined event occurs.

In a fourth example, some variants of the payment terminal can prevent unsecured, payment instrument information acquisition by the main processor by passing all potentially sensitive information through the secure processor, wherein the secure processor selectively determines which information to secure based on a predetermined set of rules or conditions (e.g., whether the information is ISO 7813 compliant). In these variants, only the secure processor is connected to and receives information from payment hardware, such as card readers (e.g., magnetic stripe readers, EMV chip readers, etc.), electronic wallet transceivers (e.g., NFC systems, Bluetooth systems, etc.), or any other suitable payment hardware. The secure processor can output secured sensitive information or output unsecured, non-sensitive information.

In a fifth example, some variants of the payment terminal can prevent unsecured, payment instrument information acquisition by the main processor by triggering secure touch processor operation in the secured mode in response to secure processor determination that sensitive, payment instrument information has been received. However, the payment terminal can reduce or eliminate sources of security breaches in any other suitable manner.

3. Method.

Receiving a payment collection request from an application 100 functions to initiate the payment process. The payment collection request is preferably received by the main processor, but can alternatively be received at the remote system, the secure processor, or any other suitable processing system. The payment collection request is preferably received by a kernel of the operating system running on the main processor, but can alternatively be received by a processing unit (e.g., processing chip) of the main processor, or otherwise received by the main processor. The payment collection request is preferably received in response to receipt of an initiation selection or input received at an input device connected to the main processor. One example of am initiation selection can include selection of a "Charge" icon. The payment collection request can be generated by the application and sent to the secure processing module (e.g., payment resource), generated by the secure processing module (e.g., wherein the application includes a predetermined initiation element in the application interface, or generated in any other suitable manner.

Generating a payment initiation request for the payment S200 functions to generate a request for the secure side 610 of the terminal. S200 can additionally include generating a payment fragment (e.g., a display element for the main and/or secure displays), wherein the payment fragment can be sent to the secure display and/or main display. The request can function to initiate a transaction in the terminal, indicate that the terminal should be operating in a secured mode, or trigger any other suitable operations. The payment initiation request is preferably generated by the main processor, more preferably the secure processing module of the main processor, even more preferably the payment resource of the secure processing module, but can alternatively be generated by any other suitable resource of the secure processing module, main processor, or any other suitable component of the payment terminal. The payment initiation request can include a request to begin a transaction, a transaction identifier, a payment amount, payment type, display selection, product information, and/or any other suitable information. The payment initiation request can be generated in response to receipt of the payment collection request (e.g., "charge" request), in response to receipt of a transaction initiation request (e.g., "start transaction" selection), in response to receipt of a securing request from the secure processing system, or in response to any other suitable generation event. The securing request can be generated by the secure processing system in response to receipt of payment information (e.g., credit card information, debit card information, IC chip information, NFC or secure element information, etc.), receipt of sensitive information (e.g., receipt of data corresponding to a social security number pattern, etc.), or in response to the occurrence of any other suitable event. However, the payment initiation request or securing notification can be generated in response to any other suitable event.

Sending the payment initiation request to a secure processing system S300 functions to communicate that the terminal should be placed in a condition to accept sensitive information. More preferably, sending the payment initiation request to the secure processing system functions to place the secure processing system, or component thereof, in a secured mode. In the secured mode, information based on input signals received at the secure input device are preferably sent to the secure processor and not forwarded the main processor, and information sent out of the secure processing system is preferably secured (e.g., encrypted, obfuscated, etc.). However, the secure processing system can operate in any other suitable manner in response to the payment initiation request communication. The payment initiation request is preferably sent by the secure processing module, more preferably the secure communication resource, to the secure processing system, but alternatively by any other suitable resource or component. The secure communication resource preferably receives the payment initiation request from the payment resource, but can alternatively receive the payment initiation request from the remote system or from any other suitable source.

In a first variation, the secure communication resource sends the payment initiation request to the secure processor, wherein the secure processor can switch operation to the secured mode in response to receipt of the payment initiation request. In a second variation, the secure communication resource sends the payment initiation request to the secure input processor, wherein the secure input processor switches from operation in the unsecured mode to the secured mode in response to receipt of the payment initiation request or notification generated therefrom. However, the payment initiation request endpoint can be any other suitable component. The payment initiation request is preferably sent by the payment resource through the secure communication resource, but can alternatively be sent by any other suitable source through any other suitable communication channel.

Generating the payment initiation request and/or sending the payment initiation request can additionally function to switch main processor and/or main input processor operation to a secured mode. In a first variation, the main processor can limit the display elements that can be displayed on the main display to a predetermined set of display elements in the secured mode. For example, the display elements can be limited to displaying payment type selection icons, transaction editing icons, or other transaction-associated icons. In a second variation, the main input processor can temporarily disconnect or prevent main input signal transfer to the main processor, such that inputs at a main input device are not registered or are limited to interaction during a predetermined set of transaction stages. However, the main processing system including the main processor and main input processor can alternatively operate in an unsecured mode during secure processing system operation in the secured mode, or operate in any other suitable manner.

Figure 6:
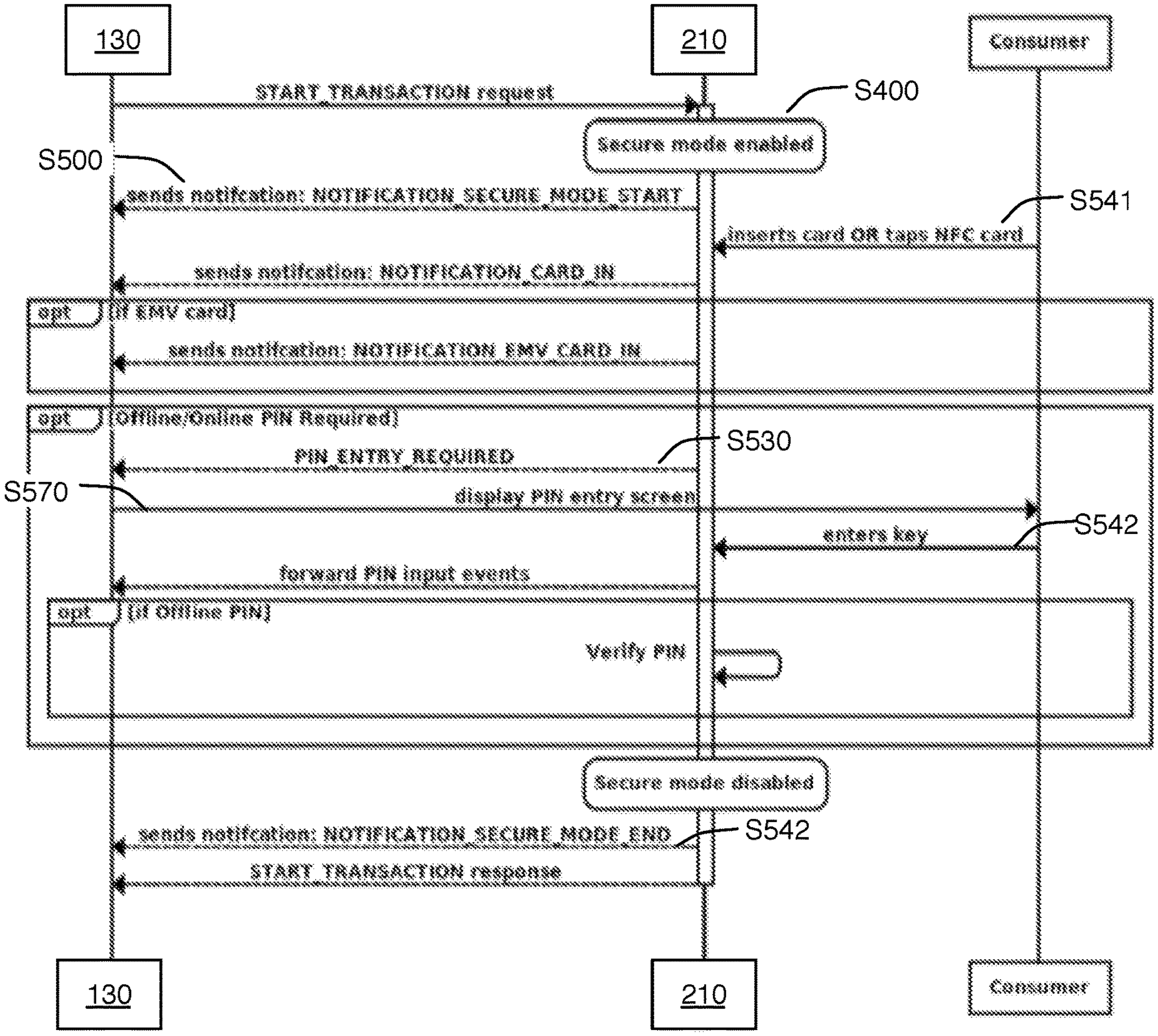
FIG. 6 is a schematic representation of an example of secure processing system operation.
Figure 7:
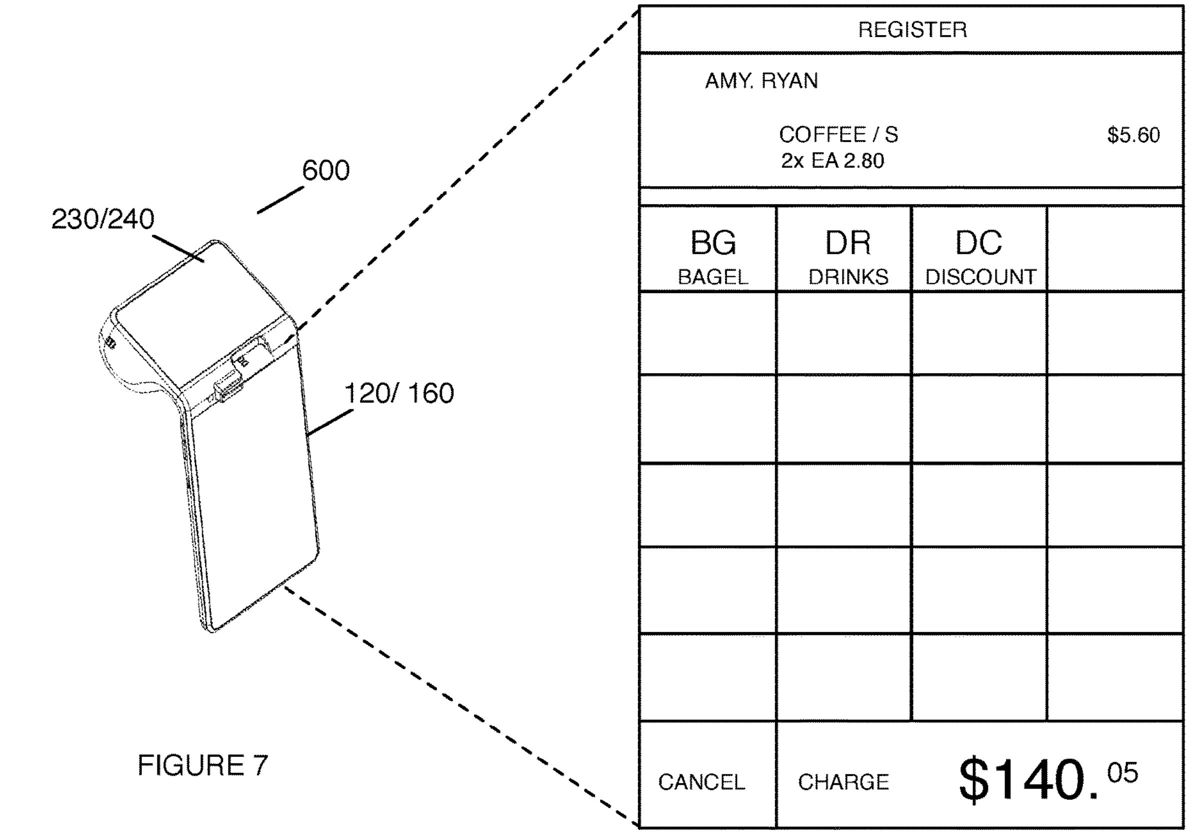
FIGS. 7 and 8 are schematic representations of a first and second example display element display on the main display, respectively.
Figure 8:
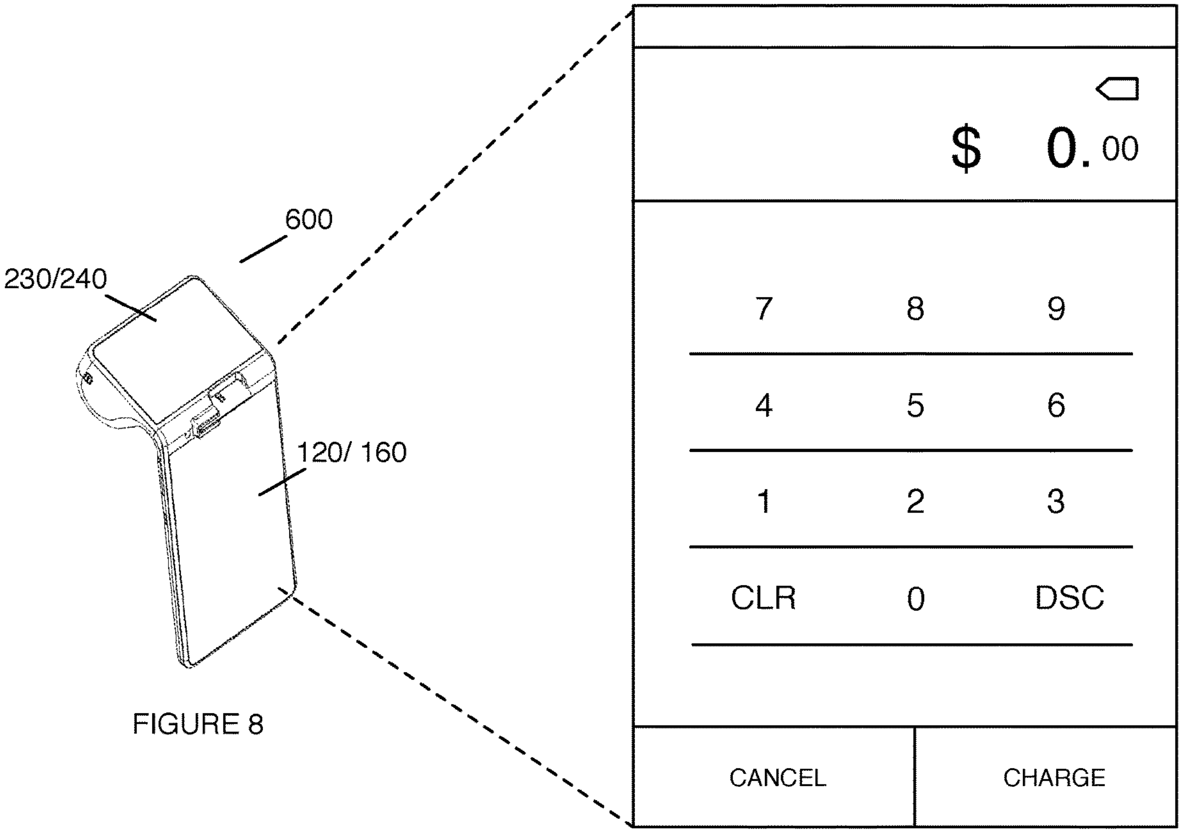

Switching the secure processing system operation mode from an unsecured mode to a secured mode S400 functions to cease input coordinate forwarding to the main processor (e.g., to substantially isolate the main processor from inputs received at the secure input device). Switching the secure processing system operation mode from the unsecured mode to the secured mode preferably includes switching the secure processor operation mode from the unsecured mode to the secured mode (e.g., when the secure input processor always provides input signals to the secure processor, and the secure processor selectively forwards the input signals to the main processor). Alternatively, switching the secure processing system operation mode can include switching the secure input processor operation mode from the unsecured mode to the secured mode, wherein the secure processor continually (e.g., only) operates in the secured mode, switching both the secure processor and secure input processor operation modes from the unsecured mode to the secured mode, switching the secure input deice operation mode from the unsecured mode to the secured mode, or switching any single secure processing system component or combination thereof from the unsecured mode to the secured mode. The secure processing system operation mode is preferably switched to the secured mode in response to receipt of the payment initiation request, but can alternatively be switched in response to receipt of sensitive information from payment hardware (e.g., receipt of credit card information), or switched in response to any other suitable switching event. The secure processing system operation mode can be controlled by the secure input processor, the secure processor, the main processor, the secure processing module, or by any other suitable component. Secure processing system operation mode control can be limited to a subset of components (e.g., only the secure processor, only the secure input processor, only the secure processor and the secure input processor, etc.), or can be universal. Switching the secure processing system to the secured operation mode can additionally include notifying the main processing system that the secure processing system is operating in the secured mode. As shown in FIG. 6, the secure processing system can additionally send the main processing system notifications of events occurring at the secure processing system (e.g., in response to receipt of the payment instrument data, verification information, etc.).

Facilitating payment information entry by a user at the secure processing system S500 functions to collect payment information from the user. The payment information 24 can include payment instrument data 20, verification data 22, or any other suitable data used to authorize a transaction with a payment provider. The payment instrument data is preferably data from a payment instrument, such as a credit card, debit card, IC chip, secure element (e.g., from an NFC payment system), or any other suitable payment instrument, but can alternatively be any other suitable data. The verification data is preferably data used to verify the authenticity of a payment instrument or cardholder, but can be any other suitable data. The verification data can be a PIN number combination, biometric measurement (e.g., fingerprint), secondary data system (e.g., drivers license, code received at a user-associated device), signature, or any other suitable verification data.

Figure 4:
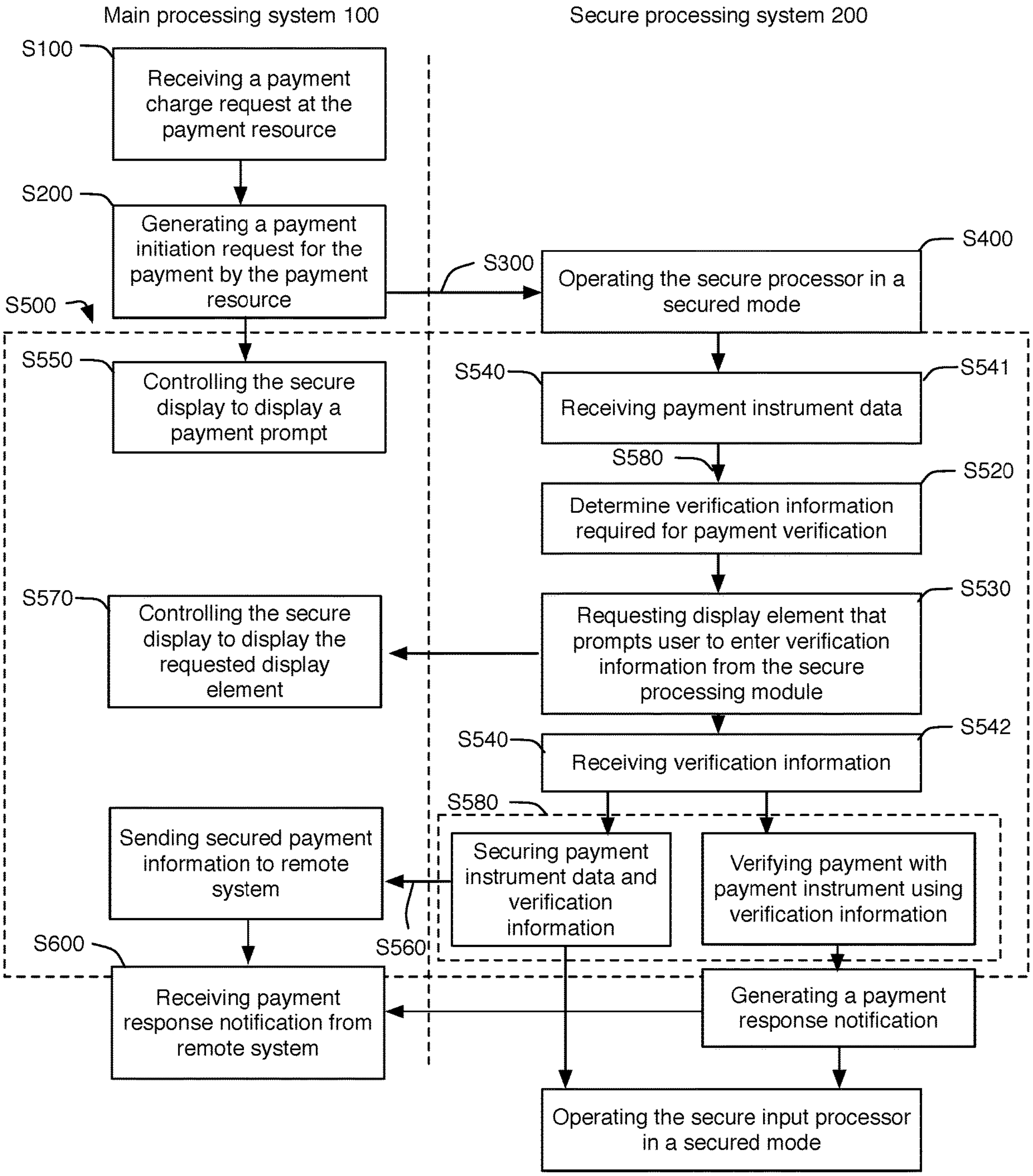
FIGS. 4 and 5 are schematic representations of a first and second variation of payment terminal operation, respectively.

As shown in FIG. 4, facilitating payment information entry S500 can include sending display requests specifying a requested interface to the main processor S530, controlling a secure display associated with the secure processing system based on display requests received from the secure processing system with the main processor S570, receiving payment information from a set of information inputs at the secure processing system S540, and processing the payment information S580. Receiving payment information from the information inputs S540 can include receiving information from the secure input device, the payment readers, or any other suitable information input. Processing the payment information S580 can include processing the payment instrument data (e.g., categorizing the data, executing instructions based on the data, etc.), processing the verification data (e.g., verifying the verification data in light of the payment instrument data), and/or otherwise processing the payment information. Facilitating payment information entry can additionally include displaying a first payment prompt at the secure display by the main processor prior to payment information receipt S550. Facilitating payment information entry can additionally include sending processed payment information to the main processor from the secure processor S560. The secure processing system preferably operates in the secured mode prior to payment information collection (e.g., in response to receipt of the payment initiation request), but can alternatively operate in the unsecured mode prior to payment information collection, wherein the secure processing system switches to the secured mode in response to payment information entry. The secure processing system preferably switch to operation in the unsecured mode after payment information entry, but can alternatively switch to operation in the unsecured mode after payment information transfer to the main processor, after payment response notification receipt, or in response to any other suitable event.

Figure 5:
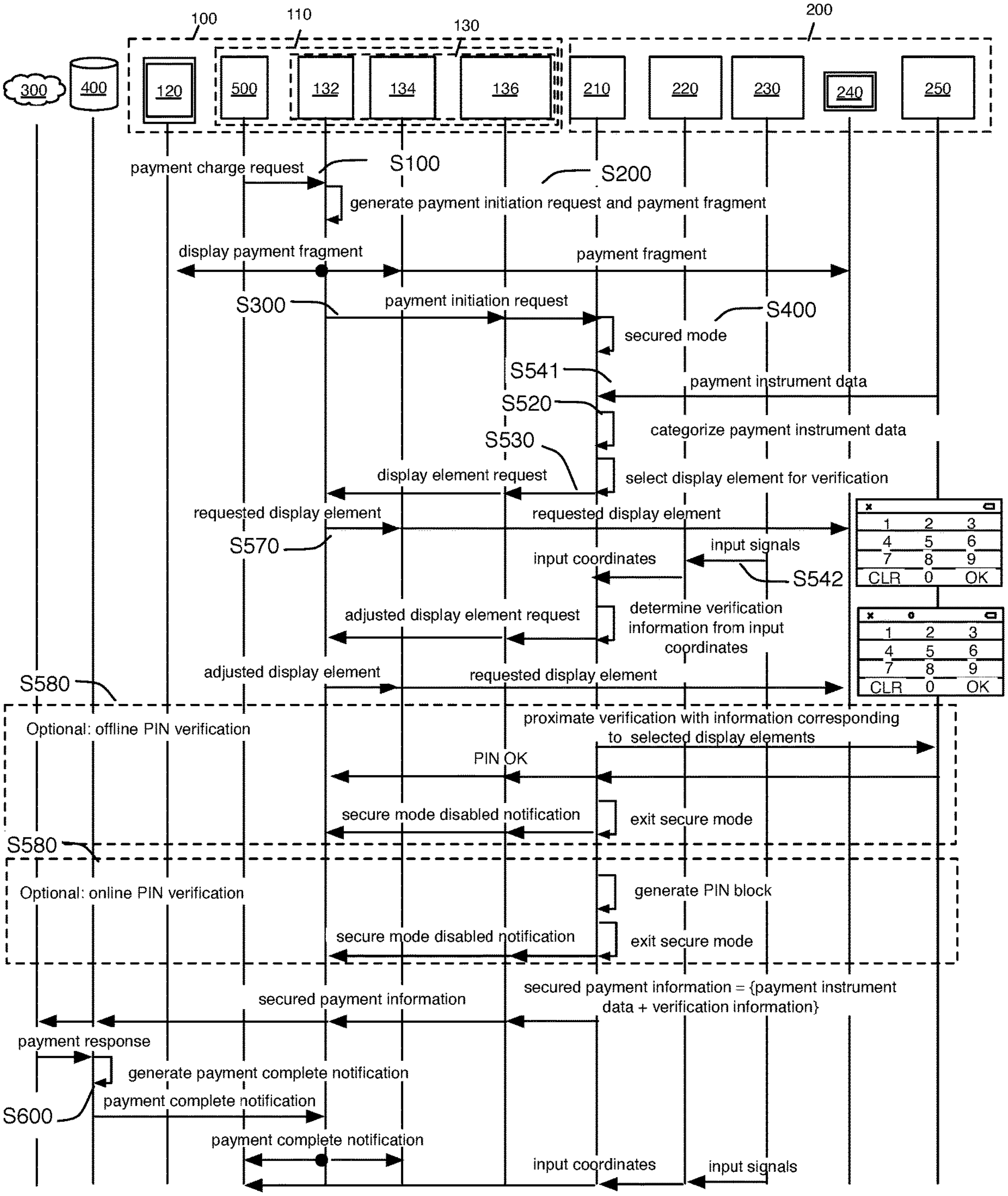

In one variation, as shown in FIG. 5, facilitating payment information entry S500 can include receiving payment instrument data S541, processing the payment instrument data S520, sending a request to the main processor specifying a requested interface (e.g., a verification display element) to be displayed on the secure display S530, wherein the verification display element is selected by the secure processing system based on the payment instrument data category, and receiving verification information at the secure processing system S542. However, payment information can be collected in any other suitable manner.

Receiving payment instrument data S541 functions to receive data to be used to facilitate transaction authorization with a payment provider. The payment instrument data (financial transaction information) is preferably received by the secure processor, but can alternatively be received by any other suitable system. More preferably, the payment instrument data is received by payment hardware and communicated to the secure processor. However, the financial transaction data can be received and/or processed in any other suitable manner. The payment hardware can be a magstripe reader, EMV card reader, secure element reader (e.g., NFC antenna), electronic data capture system, or any other suitable system capable of extracting information from a payment instrument.

Processing the payment instrument data S520 functions to analyze the payment instrument data, transform the payment instrument data, or otherwise process the payment instrument data. Processing the payment instrument data can include categorizing the data, which functions to determine which type of payment, instrument information is being used. More preferably, the payment instrument data category is used to select a display element to be subsequently displayed on the secure display.

Categorizing the payment instrument data can include receiving a category for the payment instrument from an input device (e.g., the main input device), categorizing the data based on the payment hardware from which the payment instrument data is received, categorizing the data based on the structure or content of the data itself (e.g., whether the data matches a predetermined set of conditions), or categorized in any other suitable manner.

Additionally or alternatively, the information category can be used to determine whether the data received at the secure processor should be secured or can remain unsecured prior to transfer to the main processor. Payment instrument data, verification inputs, or any other suitable information received by the secure processor that is categorized as sensitive (e.g., categorized as one of the categories deemed sensitive) are preferably always secured prior to secure processor information output, while information categorized as non-sensitive (e.g., categorized as one of the categories deemed non-sensitive, categorized as one of the categories outside of the sensitive category set) is preferably output as unsecured information by the secure processor. This preferably occurs whether the secure processing system is operating in the secured mode or unsecured mode. However, the information can be otherwise selectively secured.

Alternatively or additionally, the payment instrument data category can be used to determine the endpoint for the payment instrument data (e.g., the main processor, the remote system, a payment gateway, etc.). For example, in response to determination that a magstripe card or information received from the magstripe card is a loyalty card, the secure processor can select the main processor as the endpoint and send the information, unsecured, to the main processor, wherein the main processor sends the information to an application associated with loyalty cards, more preferably the application associated with the specific loyalty card but alternatively any loyalty card application, in response to determination that the information is loyalty card information (e.g., based on the secure processor categorization or an independent categorization). In a second example, in response to determination that a magstripe card or information received from the magstripe card is a credit card, the secure processor can select the secure processor as the endpoint. However, the payment instrument category can be otherwise used.

In a specific example, the data can be categorized as credit card information in response to the payment instrument data matching a first set of conditions, more preferably matching a predetermined pattern of alphanumeric data (e.g., matching a standard-established pattern, such as the ISO/IEC standard 7811 or ANSI Standard X4.13-1983). In a second specific example, the data can be categorized as non-sensitive information in response to the data failing the first set of conditions. In a third specific example, the data can be categorized based on the payment hardware from which the data is received, wherein data received from a magstripe reader can be debit card information, credit card information, or loyalty card information, data received from an IC chip reader can be payment card information, identification card information, authorization card information, or loyalty card information, and data received from an NFC system is secure element information. However, the data can be categorized in any other suitable manner. The payment instrument data is preferably categorized by the secure processor, but can alternatively be categorized by the payment hardware or by any other suitable system.

In a first variation, the payment type is categorized in response to detection of a payment attempt. Detecting the payment attempt can include receiving a card in a card slot, detecting short-range communication chip proximity (e.g., NFC proximity), or detecting an attempt at payment in any other suitable manner. The payment attempt is preferably physically detected (e.g., based on a switch position), but can alternatively be digitally detected (e.g., in response to a wireless connection between the terminal and a peripheral device), or detected in any other suitable manner. In this variation, selecting the payment type can include detecting the available payment types and selecting a payment type for payment use from the set of available payment types. The payment types available for payment can be determined based on the technologies provided by the connected payment systems. When multiple payment types are available, the payment type to be used can be automatically selected based on security preferences (e.g., wherein different payment types are given different security weights), automatically selected based on the balance of respective accounts associated with each payment, selected based on a payment type selection received from the main input device (e.g., from the merchant) or the secure input device (e.g., from the user), wherein the available payment types associated with the payment system can be displayed at the main display or secure display, respectively, or selected in any other suitable manner. For example, payment using the IC chip can be selected over payment using the magstripe, wherein IC chip payment is given a higher security weight than magstripe payment.

In a second variation, the payment type can be selected prior to the payment attempt, wherein a representation of the selected payment type can be sent to the secure processing system (e.g., the secure processor) and the display elements associated with the selected payment type are automatically displayed on the secure display. The payment terminal can additionally selectively monitor and/or power payment hardware associated with the selected payment type. For example, the main processor can receive a payment type selection at the main input device and send the selection to the secure processor, wherein the secure processor selectively powers and/or monitors the payment hardware associated with the selected payment type for payment information. In a first specific example, the main processor can receive a credit card selection at the main input device and send the credit card selection to the secure processor, wherein the secure processor selectively monitors a card reader for card insertion. In response to card insertion detection, the secure processor can determine whether the card includes one or more of a predetermined set of payment types or technologies (e.g., magstripe, EMV, etc.). Whether the payment system includes a payment type is preferably determined based on physical or digital connections between the payment hardware and the payment system, but can alternatively be otherwise determined. For example, presence of a magnetic stripe can be determined based on detection of a magnetic field (e.g., with a magstripe reader). In a second example, presence of an IC chip can be determined based on physical, electrical, and/or wireless connection between an IC chip reader (e.g., the contacts of the reader) and the IC chip. The secure processor can then automatically select a payment type for payment use. In a specific variation, IC chip payment can be preferentially selected over magstripe payment. However, the secure processor can select any suitable available payment type in any other suitable manner. In response to payment type selection, the secure processor can send the payment type selection or instructions 206 to display elements associated with the selected payment type to the main processor, more preferably the secure processing module but alternatively any other suitable module. The secure processing module preferably displays the associated display elements on the secure display in response to receipt of the payment type selection or instructions from the secure processing system. Inputs subsequently received by the secure input device after display element request can be interpreted by the secure processor based on a coordinate map associated with the requested display element. In a second specific example, the main processor can receive a cash payment selection, wherein the main processor controls a connected cash register to receive cash payment. For example, the main processor can instruct the cash register to open in response to receipt of the cash payment selection.

Categorizing the payment instrument data can additionally include selecting one or more display elements to be subsequently displayed on the secure display. The display element is preferably selected by the system categorizing the data, but can alternatively be a separate system, wherein the data, input, or other financial transaction category can be sent to the selecting system. The display element is preferably automatically selected based on the data category, but can alternatively be selected independent of the data category or selected in any other suitable manner. The selected display element preferably includes instructions and/or interfaces to collect verification information from the user. In a first example, instructions to leave the card in the card reader and a PIN pad are selected for display in response to determination that the payment instrument is an IC chip. In a second example, instructions to retract the card from the card reader and a PIN pad are selected for display in response to determination that the payment instrument is a debit card. In a third example, a PIN pad is selected for display in response to determination that the payment instrument is a secure element. In a fourth example, instructions to retract the card from the card reader can be selected in response to determination that the payment instrument is a credit card. However, any other suitable set of display elements can be selected based on any other suitable payment instrument category.

Sending a request to the main processor specifying a requested interface to be displayed on the secure display S530 functions to instruct the main processor to display the selected display elements. The requested interface is preferably a verification display element, such that verification information can be collected from the user, but can alternatively be any other suitable interface. When multiple display elements are selected, the request can additionally include timing elements (e.g., display duration). Alternatively, the main processor can automatically determine the timing for each display element. Alternatively, the secure processor can send the main processor a request for the next display element in response to receipt of a user interaction at the secure processing system. For example, in response to determination that the payment instrument is a debit card, the secure processor can send the main processor a first request to display instructions to remove the debit card, read the debit card magnetic stripe during debit card retraction, and in response to receipt of the debit card information from the magstripe reader, send the main processor a first request to display PIN instructions.

Figure 12:
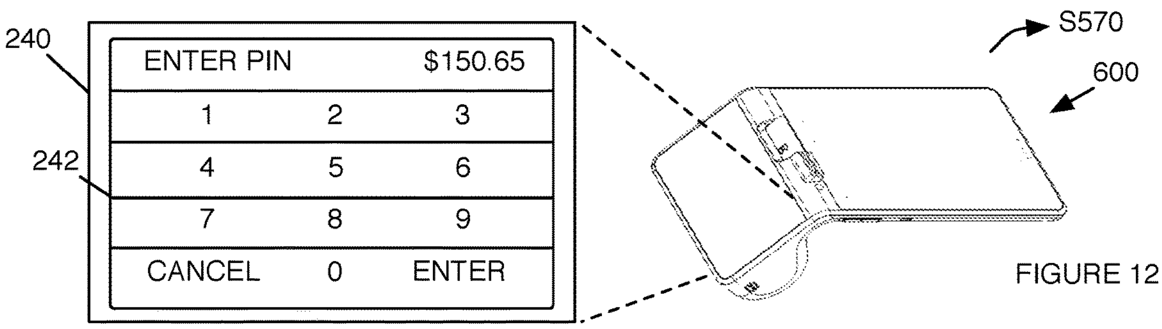
FIG. 12 is a schematic representation of an example of displaying a PIN number pad on the secure display.

Controlling the secure display of the secure processing system to display one or more display elements functions to present display elements that notify a user of the instantaneous payment flow step. The secure display is preferably controlled by the secure processing module, more preferably by the secure display resource, but can alternatively be controlled by any other suitable component. In a first variation, the secure display can be automatically controlled by the secure processing module, independent of secure processing system operation. In a second variation, the secure display can be controlled by the secure processing module to display requested display elements, based on display requests received from the secure processing system (e.g., from the secure processor) S570. In a specific example, as shown in FIG. 12, the secure display resource can control the secure display to display a PIN pad in response to receipt of a display request from the secure processing system (e.g., the secure processor). In a third variation, the secure display can be controlled by the secure processing module based on the detection of trigger events, such as receipt of a card in the payment hardware (e.g., card reader), receipt of secure information at the secure input device, or in response to receipt of any other suitable information. In this variation, the display element displayed on the secure display can be selected by the secure processing module based on the information source (e.g., wherein a first display element is displayed in response to information receipt from a first information source and a second display element is displayed in response to information receipt from a second information source), the type of information (e.g., wherein a first display element is displayed in response to receipt of a first information type, such as credit card information, and a second display element is displayed in response to receipt of a second information type, such as gift card information), the payment type (e.g., wherein a first or second display element is displayed in response to determination of a first or second payment type, respectively), or selected in any other suitable manner. In one example, a PIN pad can be displayed when a debit, IC chip (e.g., EMV chip), or secure element is selected for payment, while a signature field can be displayed in response to credit card selection for payment. However, the display element displayed on the secure display can be determined in any other suitable manner.

Receiving verification information at the secure processing system S542 functions to receive information verifying the card or cardholder. The verification information is preferably received in response to requested display element display, but can be received independent of requested display element display or received at any other suitable time. The verification information is preferably received at the secure input device, but can alternatively be received at payment hardware (e.g., wherein verification information, such as information from a second secure element, driver license information, social security information, etc. is received at the same or different payment hardware), or received at any other suitable system.

Figure 13:
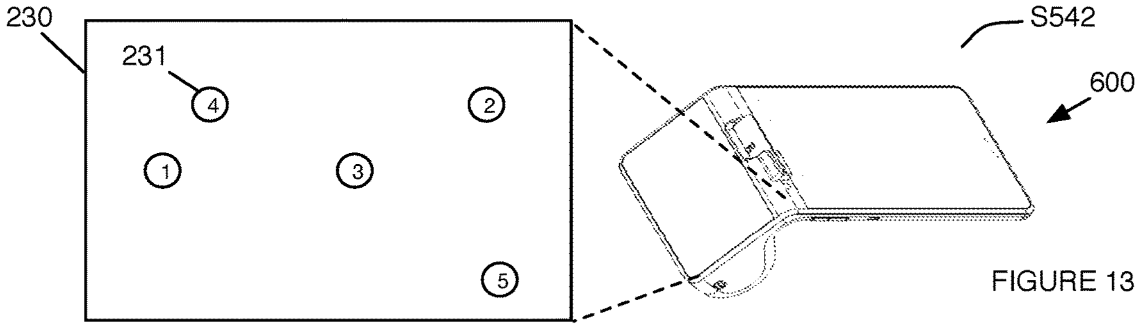
FIG. 13 is a schematic representation of an example of measuring input signals at the secure input device while the PIN number pad of FIG. 12 is displayed.
Figure 14:
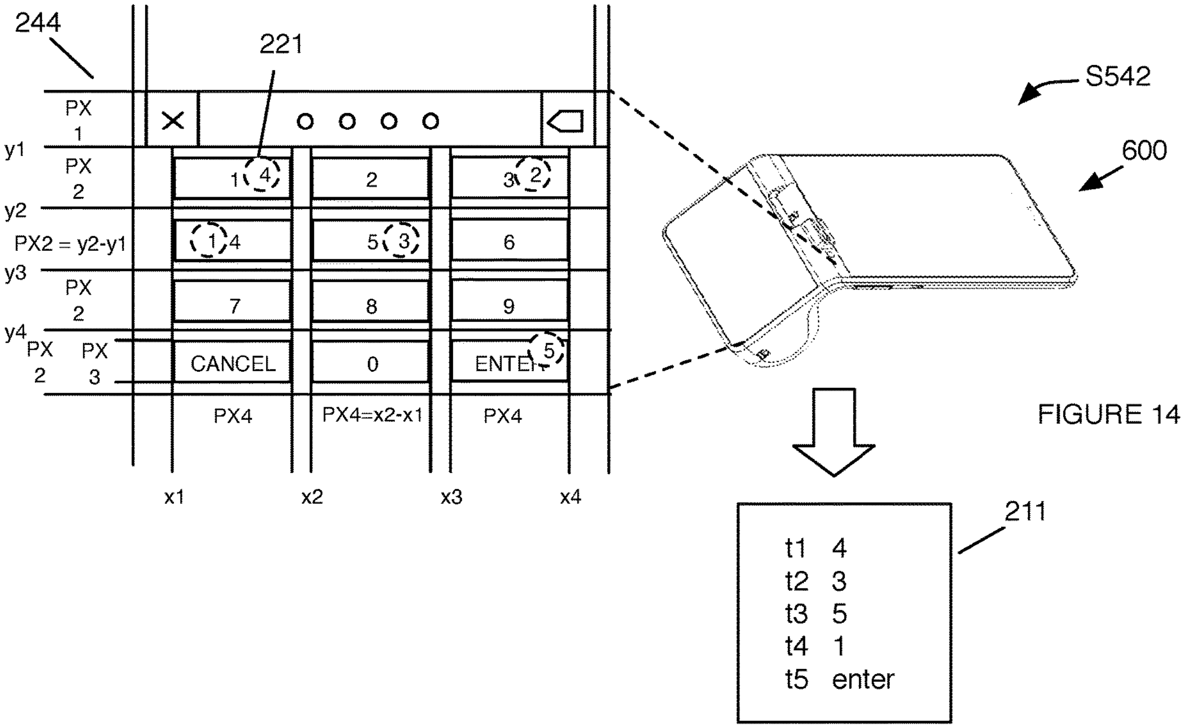
FIG. 14 is a schematic representation of an example of interpreting secure input coordinates based on a coordinate map associated with the display element.
Figure 15:
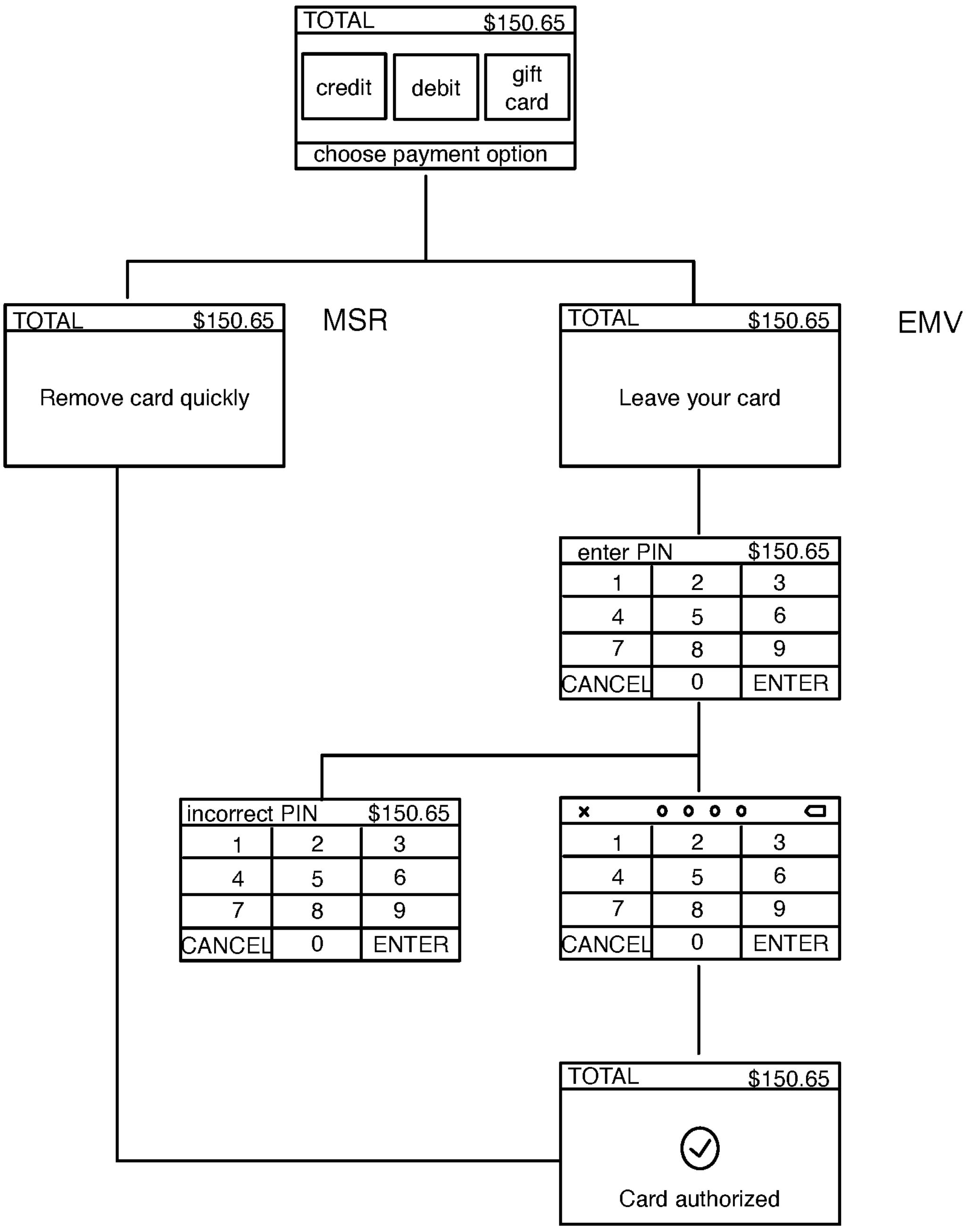
FIG. 15 is a schematic flow representation of an example of the display elements displayed on the secure display during payment information entry.

Receiving the verification information at the secure input device S542 can include receiving input signals generated by the secure input device in response to user interaction with the secure input device at the secure input processor, converting the input signals to secure input coordinates by the secure input processor, sending the secure input coordinates to the secure processor, and interpreting the secure input coordinates based on a coordinate map associated with the requested display element by the secure processor. In a specific variation, the secure input device is a touchscreen, wherein the secure input processor can convert the input signals to touch coordinates, as shown in FIG. 13. The touchscreen can include a first broad face extending over the respective display broad face, more preferably along the display active surface but alternatively any other suitable portion of the display. The secure input processor can additionally unobfuscate the input signals. The coordinate map associated with the requested display element is preferably fixed (e.g., predetermined) since the user interaction areas of the display element are preferably static. When the user interaction areas of the display element are static, the secure processor can interpret the touch coordinates into selected display elements based on an assumption of what was displayed on the secure display during input signal receipt (e.g., the requested display element). In a specific example in which the secure processor requested the PIN pad, the secure processor can map touch coordinates, received within a predetermined period of time after request transmission, to a set of alphanumeric outputs 211 based on the predetermined touch coordinate to display coordinate map associated with the PIN pad that is stored by the secure processor, as shown in FIG. 14. Alternatively, the coordinate map associated with the requested display element can be variable, wherein the touch coordinate-to-display coordinate mapping can be received from the main processor, dynamically determined, or otherwise determined. The coordinate map can be variable when the user interaction areas of the display element can be adjusted (e.g., wherein an application adjusts the size, location, or other feature of the user interaction areas), or be variable in any other suitable manner.

Figure 11:
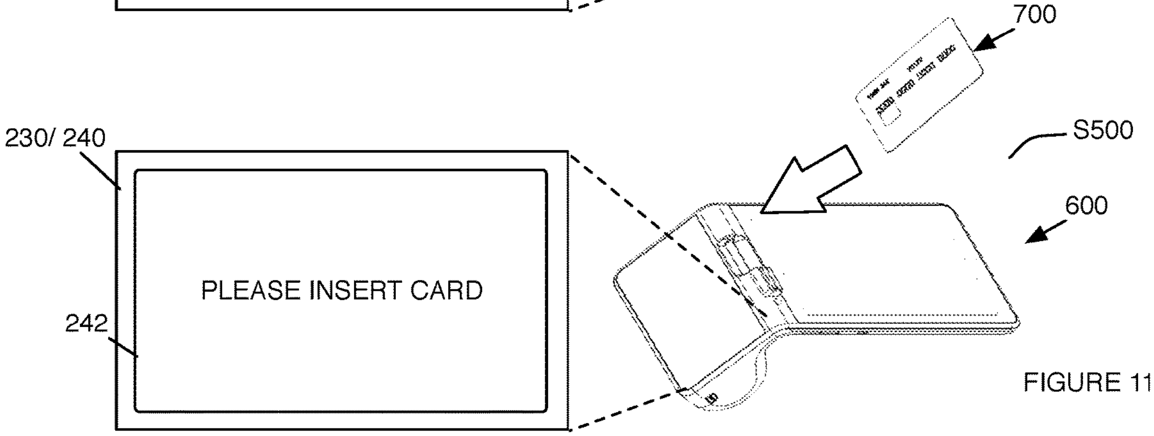
FIG. 11 is a schematic representation of an example of displaying a first payment prompt at the secure display.

Facilitating payment information entry S500 can additionally include displaying a first payment prompt at the secure display prior to payment information receipt S550, as shown in FIG. 11. Displaying the first payment prompt functions to provide visual instructions to a customer for payment information entry. The first payment prompt is preferably displayed by the main processor on the secure display, more preferably by the secure processing module but alternatively by any other suitable module. Alternatively, the first payment prompt can be displayed by any other suitable system controlling the secure display. The first payment prompt can be generic (e.g., "select payment type") or specific to a predetermined payment type, wherein the payment type can be selected by the merchant on a main input device or selected by the customer on the secure input device.

Facilitating payment information entry S500 can additionally include processing the payment information S580. Processing the payment information preferably includes verifying the payment information, but the payment information can be otherwise processed. The payment information can be verified with a remote system (remote verification), verified with the payment instrument from which a portion of the payment information was received (proximate verification), or verified in any other suitable manner.

When the information is proximately verified, the secure processor can send the verification information to the payment instrument (e.g., the IC chip or secure element), wherein the payment instrument sends a payment response to the payment terminal based on the verification information, wherein the main processor, secure processor, or other component receives the payment response 15 or notification 16 based on the payment response (payment complete notification, payment response notification) S600. Alternatively, the secure processor can check the verification information against information on the payment instrument, and generate a payment response (e.g., a PIN ok notification) based on the degree of information matching. However, the information can be otherwise proximately verified.

When the information is remotely verified, the method can additionally include securing the payment information (e.g., a PIN block generated by the secure processor) and sending the secured payment information to the main processor. The main processor, which is connected to a communication module (e.g., cellular system, WiFi system, etc.), preferably sends the secured payment information to a remote system. Securing the payment information preferably includes encrypting the payment information with encryption keys stored by the secure processor (e.g., issuer's or acquirer's encryption keys, manufacturer encryption keys, etc.), but can alternatively include securing the information in any other suitable manner. The remote system can be the system that stores the transaction information or another intermediary, wherein the remote system forwards the secured payment information to a payment entity 300, such as a payment gateway. The payment entity can process the secured payment information, and send the remote system a payment response based on the secured payment information, wherein the payment response can include the transaction information, the payment status (e.g., verified, denied, cancelled, etc.), and/or any other suitable information. The remote system can send the payment response or a notification based on the payment response (payment response notification) to the payment terminal, more preferably the main processor but alternatively any other suitable component, wherein the payment terminal component receives the payment response notification S600. The remote system can additionally store the payment response, extract and store information of interest (response information, such as whether the payment was successful or denied) from the payment response, or otherwise process the payment response. However, the information can be otherwise remotely verified.

Securing the payment information functions to prevent unauthorized access to the payment information. The secured data is preferably sensitive data, but can alternatively be data destined for a predetermined endpoint (e.g., such as a payment gateway, wherein the endpoint is determined based on the data category), or be any other suitable data. For example, data destined for the main processor is preferably unencrypted, while data destined for a payment gateway is preferably encrypted. However, the data can be otherwise secured based on the endpoint. Sensitive data preferably includes payment data, wherein the payment data can include the payment instrument data and/or the verification information. However, sensitive data can include any data satisfying a set of conditions (e.g., patterns indicative of sensitive data, such as patterns indicative of social security information, biometric information, etc., data received from one of a set of predetermined information inputs, etc.), data received by the secure processor that falls within one of a predetermined set of sensitive categories (e.g., payment data), or any other suitable information. The sensitive data is preferably secured by the secure processor prior to communication to the main processor. However, the sensitive data can be secured by the payment instrument (e.g., the credit card) or any other suitable system. Securing the sensitive data preferably includes encrypting the sensitive data, but can alternatively include obfuscating the data or otherwise securing the data. The sensitive data can be encrypted with a key stored by the secure processor, received from the payment instrument, associated with a predetermined endpoint (e.g., wherein data destined for the main processor is encrypted with a first key and data destined for a payment gateway is encrypted with a second key), or encrypted in any other suitable manner. However, the data can be otherwise secured.

Sending processed payment information to the main processor S560 functions to communicate information received by the secure processing system to the main processor and/or remote system. The processed information inputs can be the secured data (e.g., secured payment data), be information categorized as non-sensitive by the secure processor, be input coordinates determined by the secure input processor (e.g., when the secure input processor is operating in the unsecured mode), or be any other suitable information. The processed payment information is preferably sent through the secure communication resource to the main processor, but can alternatively be sent directly to a communication module or another endpoint. The processed payment information is preferably sent by the secure processor, but can alternatively be sent by any other suitable component.

The method can additionally include switching the payment terminal from a secured mode to an unsecured mode. Switching the payment terminal from a secured mode to an unsecured mode preferably includes switching the secure processing system from the secured mode to the unsecured mode, more preferably switching the secure input processor from the secured mode to the unsecured mode but alternatively switching the secure processor from the secured mode to the unsecured mode or switching any other suitable component from the secured mode to the unsecured mode. The payment terminal can be switched from the secured mode to the unsecured mode a predetermined time duration after payment initiation request receipt, after a predetermined time duration of operating in the secured mode, in response to receipt of the payment deactivation notification, in response to a switching request received from the main processor (e.g., the secure processing module), in response to PIN verification from the payment instrument, in response to PIN block generation based on card issuer or network keys, or in response to the occurrence of any other suitable event. The payment initiation request deactivation notification can be generated in response to payment response receipt, payment information transmission to the remote system, or generated in response to the occurrence of any other suitable event.

Figure 18:
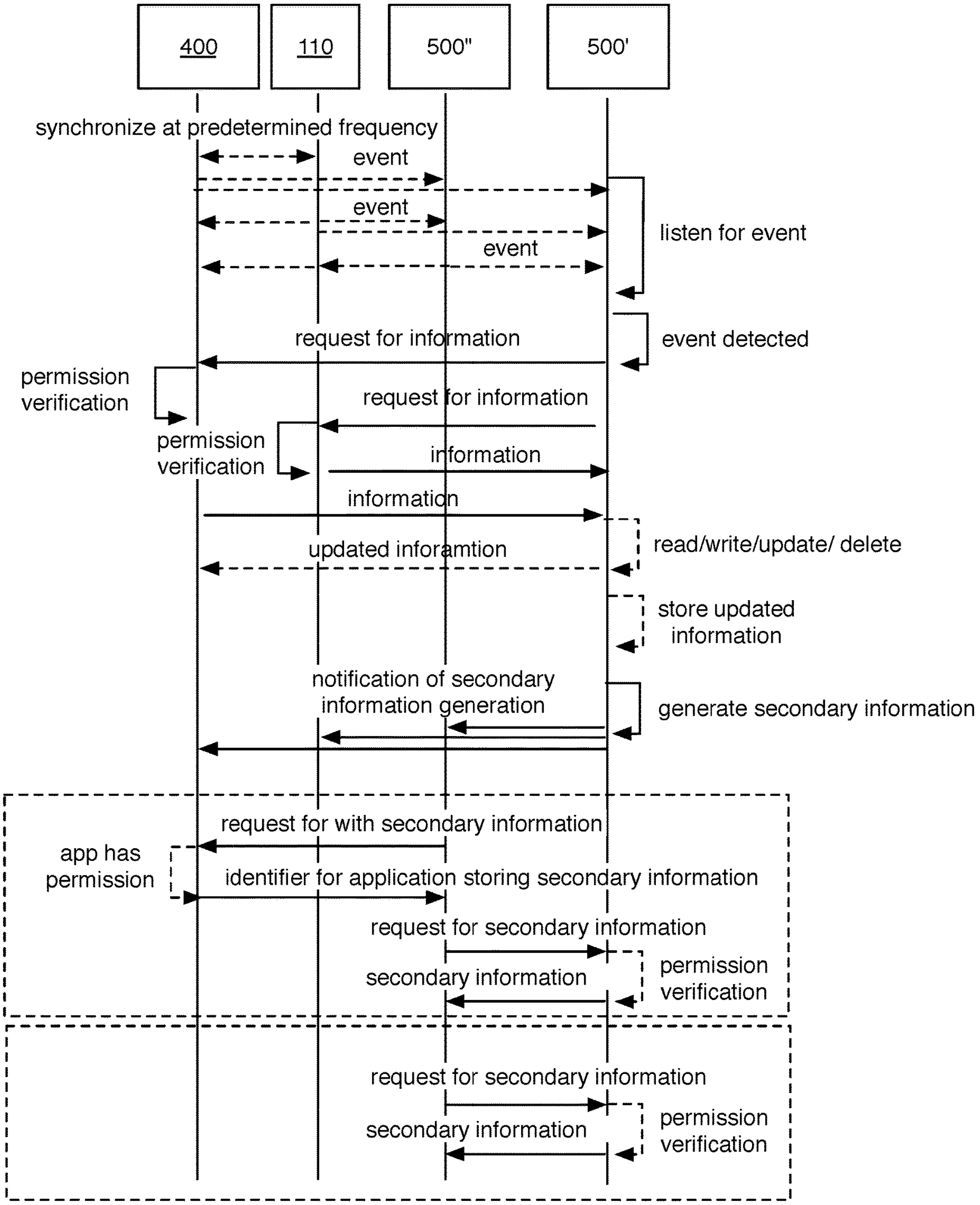
FIG. 18 is a schematic representation of a variation of event broadcasting between the remote system, payment terminal, a first application 500', and a second application 500".
Figure 19:
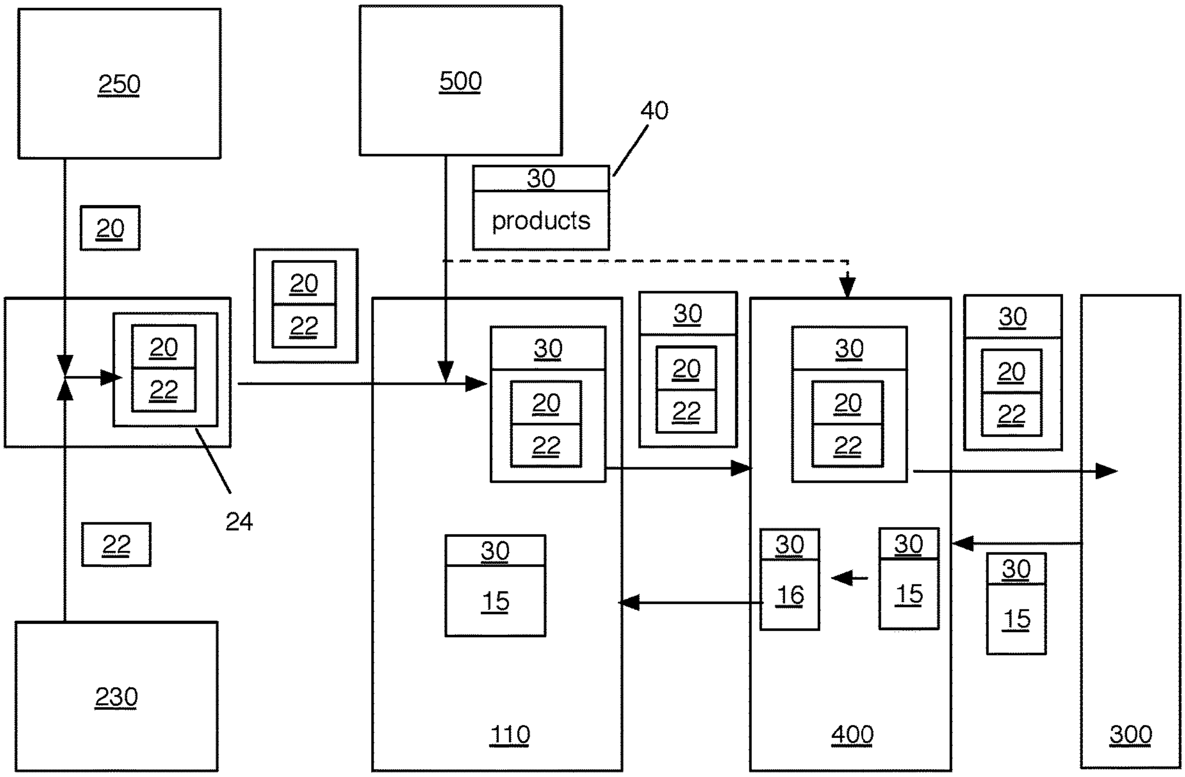
FIG. 19 is a schematic representation of an example of payment information processing, including receiving the payment information at the secure processor, securing the payment information at the secure processor, sending the secured payment information to the main processor, processing the secured payment information at the main processor or remote system, sending the processed secured payment information to a payment entity, receiving a payment response, and generating a payment notification based on the payment response.

As shown in FIG. 18, the method can additionally include transmitting a transaction notification or event to applications or secondary payment terminals. The transaction notification can be the payment notification, but can alternatively be generated based on the payment notification, payment response, or based on any other suitable information. The transaction notification can include a transaction identifier, the payment response status (e.g., verified, denied, cancelled, incomplete, etc.), the source at which the respective transaction-associated information is stored, and/or any other suitable information. The transaction notification is preferably transmitted globally by the remote system, but can alternatively be transmitted locally by the payment terminal, or transmitted by any other suitable system. The applications and/or payment terminals receiving the notification are preferably associated with a merchant identifier (e.g., merchant account), wherein the merchant identifier is preferably associated with the transaction. The merchant identifier can be associated with the transaction through the payment terminal that facilitated the transaction (e.g., wherein the respective payment terminal identifier is associated with the merchant identifier or account), through the order information, or associated with the transaction information in any other suitable manner. The transaction notification is preferably broadcast to all applications and/or payment terminals, but can alternatively be specifically sent to targeted applications or payment terminals, broadcast to a portion of the plurality of applications (e.g., applications having permissions to receive the notification) or payment terminals, or otherwise transmitted to the applications or payment terminals. The transaction notification is preferably transmitted substantially concurrently to the recipient applications, but can alternatively be transmitted to different applications at different times.

In response to receipt of the transaction notification or other notification, an application preferably requests all or a subset of the transaction-associated information, wherein the request can include the transaction identifier included in the notification. The request can be broadcast, wherein the source application or system can detect the request and automatically respond to the request, or be sent to a targeted endpoint, wherein the endpoint can be identified in the notification, be predetermined to be associated with the information (e.g., based on a merchant assignment, default rules, etc.), or determined in any other suitable manner. For example, the remote system can be known to have the most up-to-date transaction information, so the requesting application can send a transaction information request to the remote system, while an inventory application can be known to have the most up-to-date inventory information, so the request for an inventory summary can be sent to the inventory application. The transaction information request can additionally include encryption keys, a list of requested pieces of transaction-associated information (e.g., the products associated with the transaction, the transaction amount, the duration that the order was outstanding, etc.), or any other suitable information. Alternatively, no transaction notifications can be sent, wherein the applications query the storage system (e.g., the remote system) at a predetermined frequency to determine whether new transactions have occurred.

In response to receipt of the request, the source can send the requested information to the requesting application or permit the requesting application to perform a requested action on the information (e.g., read, write, edit, delete, create, etc.). The source can additionally determine whether the requesting application has permissions to the requested information, wherein the source enables application access to the information only in response to determination that the requesting application has permission to access the requested information. The permissions can be determined by entity creating the application, by the merchant, an user (e.g., employee) associated with the merchant, by an entity associated with the remote system, or determined by any other suitable entity. For example, an accounting application can only be permitted to read and/or receive transaction-related information, whereas a food ordering application can be permitted to both create and edit orders.

In response to receipt of the transaction notification or any other suitable notification, secondary payment terminals can request the information from the remote system, primary payment terminal, or other master system. Alternatively, the transaction notifications and/or any other notifications can be not sent to the secondary payment terminals, wherein the secondary payment terminals must request updated information from the master system at a predetermined frequency, in response to an update event (e.g., in response to a user query or application query), or at any other suitable frequency. However, the payment terminals can be otherwise updated.

Figure 25:
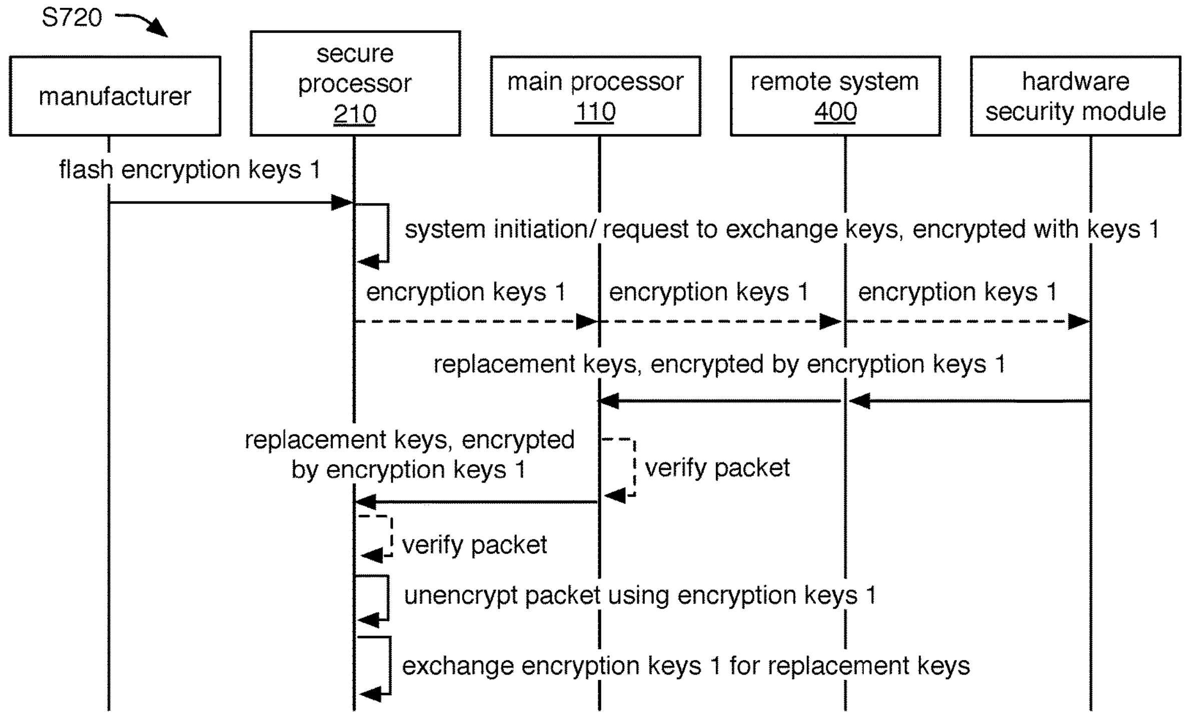
FIG. 25 is a schematic representation of a variation of encryption key exchange at the secure processor.

As shown in FIG. 25, the method can additionally include exchanging the encryption keys stored by the payment terminal S720, more preferably the encryption keys stored by the secure processor, but alternatively any other suitable set of encryption keys. The encryption keys are preferably automatically exchanged by the payment terminal, but can alternatively be manually exchanged or otherwise exchanged. The encryption keys can be exchanged in response to system initiation (e.g., initial system use), receipt of a request to exchange the keys, receipt of the set of replacement keys, or in response to any other suitable condition being met. The request can be certified (e.g., with the public key certificate), encrypted (e.g., with the first set or complimentary set of encryption keys), otherwise secured, or unsecured. The payment terminal exchanging the keys is preferably a deployed terminal (e.g., remote from the hardware security module or HSM), but can alternatively be proximal the HSM or be arranged in any other suitable location.

Exchanging encryption keys stored by the secure processor can include exchanging manufacturer keys for acquirer keys (e.g., keys from a credit card company, etc.), exchanging a first acquirer's keys for a second acquirer's keys, or exchanging any suitable first set of encryption keys (original keys) for any other suitable second set of encryption keys (replacement keys). The first set of encryption keys can be keys stored (e.g., flashed) onto the secure processor or associated memory by the manufacturer, keys stored by the secure processor in response to performance of the method, or keys installed in any other suitable manner. Exchanging the encryption keys can include receiving a set of replacement encryption keys from a hardware security module (e.g., of an acquirer), wherein the set of replacement encryption keys are encrypted with the set of encryption keys stored by the secure processor, receiving the set of replacement encryption keys at the secure processor, decrypting the set of replacement encryption keys using the first set of encryption keys, and replacing the first set of encryption keys with the replacement set of encryption keys. The encryption keys are preferably received at the remote system, sent to the main processor of the payment terminal, and sent to the secure processor for decryption. However, the encryption keys can be received at the main processor from the hardware security module and sent to the secure processor, received directly at the secure processor from the hardware security module, received at the secure processor from the remote system, or received through any other suitable component. Exchanging encryption keys can additionally include verifying the set of replacement encryption keys prior to decryption. The set of replacement encryption keys can be verified with the public key certificate by the main processor, the secure processor, the remote system, or any other suitable processing system. Exchanging encryption keys can additionally include sending the first set of encryption keys or other identifier for the first set of encryption keys to the HSM or replacement key supplier. The identifier can be sent directly to the HSM from the secure processor, relayed through the main processor to the HSM, relayed through the main processor and the remote system to the HSM, or sent to the HSM in any other suitable manner.

The method can additionally include updating or replacing the firmware on a deployed (e.g., remote) payment terminal S730. The firmware can be the firmware stored and executed by the main processor, be the firmware stored and executed by the secure processor, and/or be any other suitable payment terminal firmware. The firmware is preferably automatically updated by the payment terminal, but can alternatively be manually updated or otherwise updated. The firmware can be updated in response to system initiation (e.g., initial system use), receipt of a request to update the firmware, receipt of the firmware replacement packet (e.g., firmware update packet), or in response to any other suitable condition being met. The request can be certified (e.g., with the public key certificate), encrypted (e.g., with the first set or complimentary set of encryption keys), otherwise secured, or unsecured.

In a first variation, the main processor firmware is updated. Updating the main processor firmware can include receiving the packet including the replacement firmware (e.g., firmware update) at the main processor from the remote system, verifying the packet with the public key certificate stored by the main processor, and installing the replacement firmware in response to verification. However, the main processor firmware can be otherwise updated.

Figure 26:
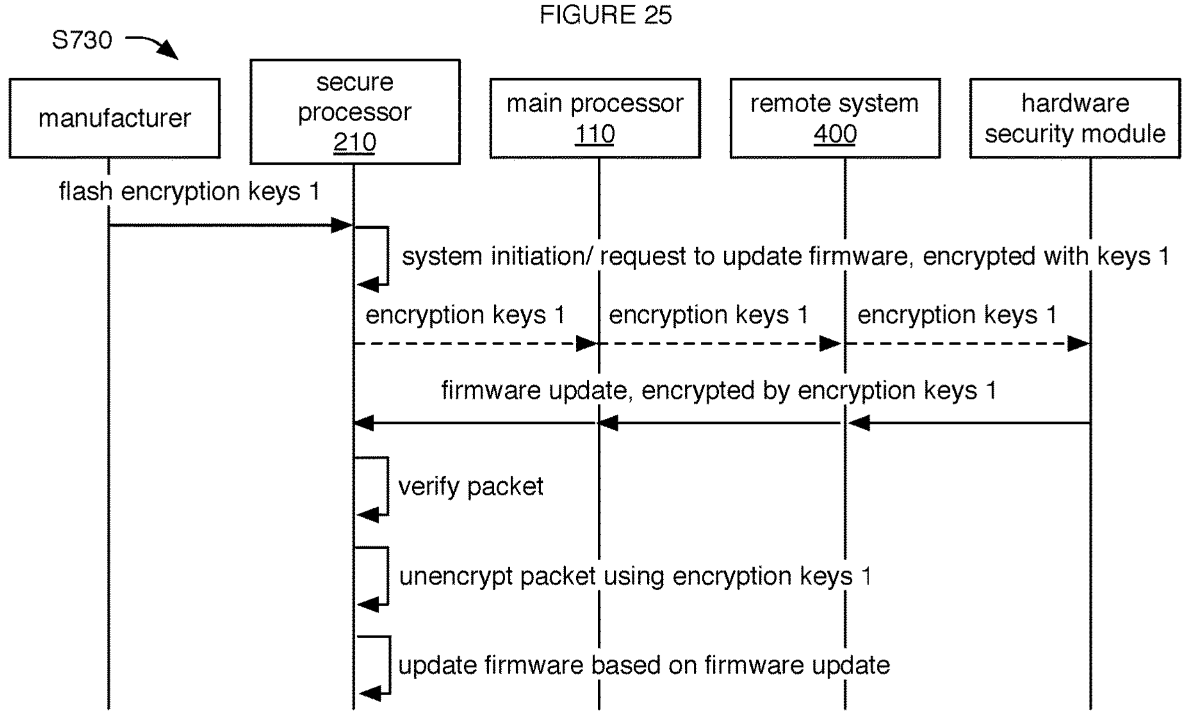
FIG. 26 is a schematic representation of a variation of secure processor firmware update.

In a second variation, as shown in FIG. 26, the secure processor firmware is updated. The replacement firmware can be supplied by the hardware security module of an issuer (e.g., bank), payment network (e.g., VISA), any other suitable payment entity, or any other suitable entity. The firmware replacement packet can be relayed through the remote system to the main processor to the secure processor from the payment entity, sent directly from the payment entity to the main processor, sent directly from the payment entity to the secure processor, or communicated to the payment terminal in any other suitable manner. The replacement firmware can be installed in a similar manner to replacement key exchange, or can be installed using a different method. In one example, the secure processor can decrypt the firmware replacement packet using the set of encryption keys stored by the secure processor and update the firmware based on the firmware replacement. The secure processor can additionally verify the firmware replacement packet (e.g., using the public key certificate used to verify applications or a different public key certificate stored by the secure processor). Alternatively, the main processor can verify the firmware replacement packet, wherein the main processor receives the firmware replacement packet and sends the firmware replacement packet to the secure processor in response to firmware replacement packet verification. However, the firmware replacement packet can be verified by the remote system or be otherwise verified. The method can additionally include sending the encryption keys currently stored by the payment terminal (e.g., by the secure processor) or an identifier thereof to the payment entity. The encryption keys or identifier can be sent through the main processor, the remote system, and/or any other suitable intermediary to the HSM from the secure processor.

Figure 27:
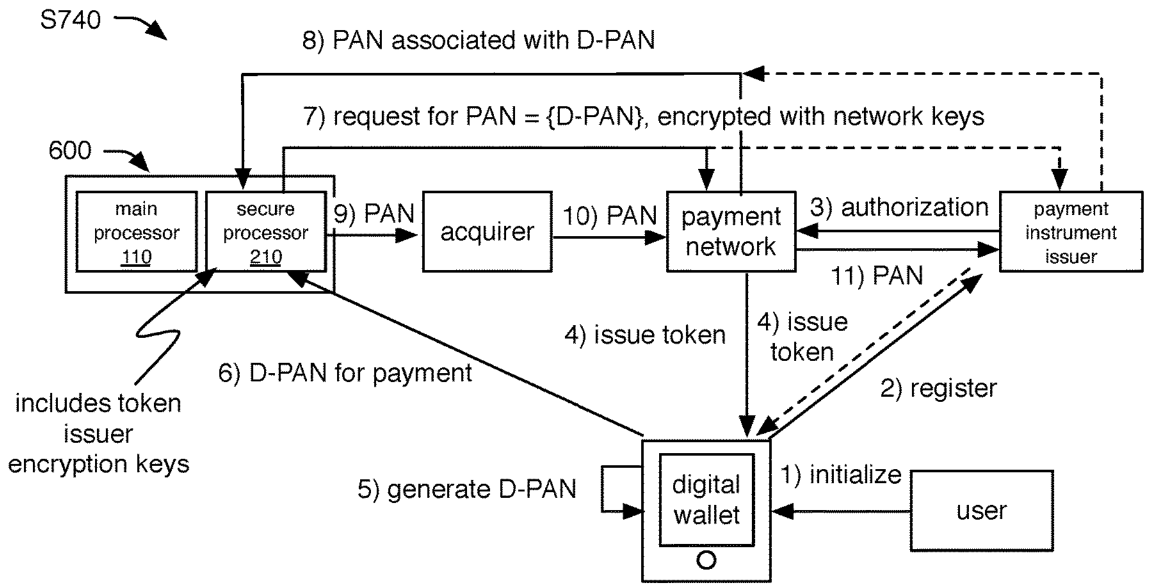
FIG. 27 is a schematic representation of token generation and secure processor D-PAN request from a token issuer.

As shown in FIG. 27, the method can additionally include requesting a PAN (primary account number) from a network, issuer, or any other suitable payment token issuer S740, wherein the PAN request can be encrypted by the encryption keys associated with the payment token issuer. This can function to provide acquirers with a PAN instead of a D-PAN (digital primary account number) or other surrogate value received from a digital token (e.g., from a digital wallet operator), such that the acquirer can use PAN-related information in analysis. The payment terminal can request the PAN numbers directly from the token issuer because the PAN numbers are encrypted with encryption keys associated with (e.g., provided by) the token issuer, wherein the secure processor can function as a secured extension of the token issuer.

Figure 28:
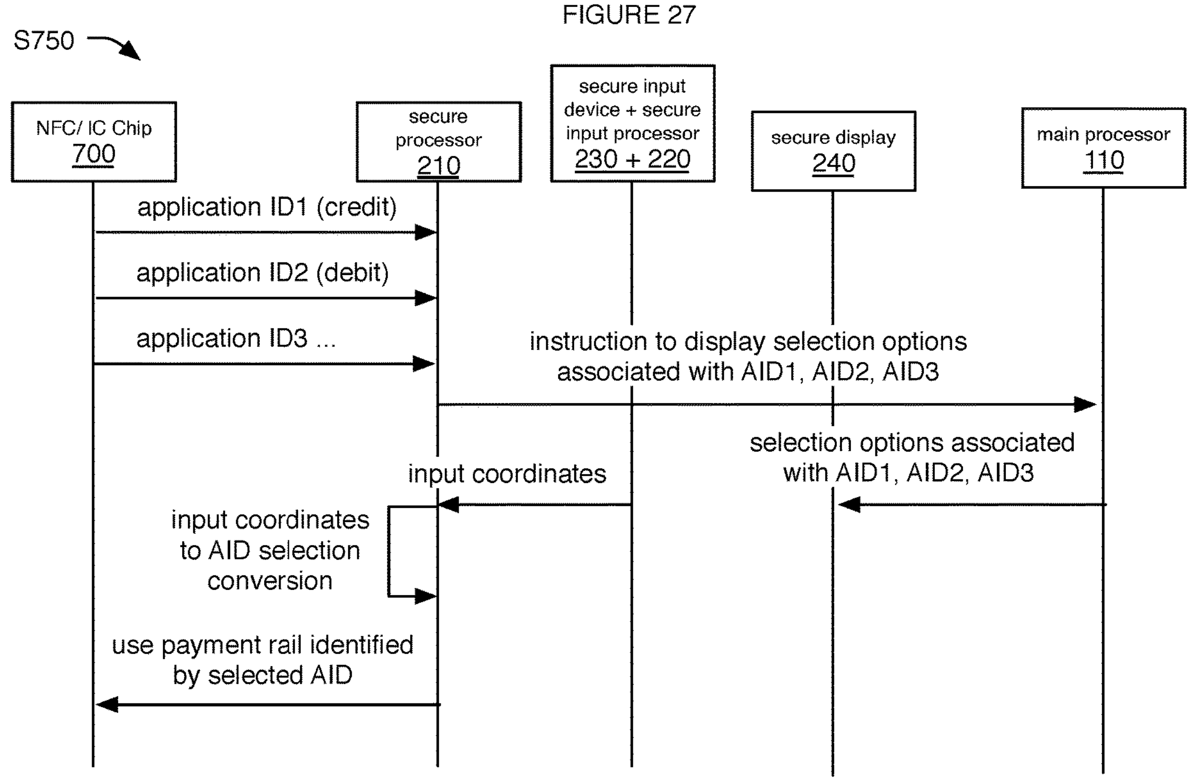
FIG. 28 is a schematic representation of reading two or more AIDs, each AID identifying a different payment rail available through the payment instrument, prior to payment rail selection and use for payment.

As shown in FIG. 28, the method can additionally include identifying the AIDs (application identifiers) associated with two or more (e.g., all) payment rails (e.g., credit rail, debit rail, token rail, etc.) supported by a payment instrument at the payment terminal S750. This can function to place pre-existing payment instruments in compliance with legislation (e.g., the Durbin amendment). The payment instrument is preferably an NFC chip, IC chip, or other payment instrument that includes a hard-coded payment rail preference, but can alternatively include any other suitable payment instrument. The payment terminal preferably reads the two or more AIDs (e.g., identifies multiple payment rails that are available) prior to selecting the payment rail for payment use. In response to connection with the payment instrument (e.g., physical or digital connection), the payment terminal, more preferably the secure processor, can read two or more AIDs from the payment instrument (e.g., by controlling the payment hardware to read two or more AIDs from the payment instrument), select display selection options (e.g., icons) associated with the two or more AIDs, and display the selected display selection options at the secure display (e.g., with the secure display resource of the main processor or the secure processor itself). The secure processor can then receive input coordinates from the secure input processor, identify the AID associated with the selected display options based on the input coordinates, and use the payment rail identified by the selected AID to make the payment. However, the payment terminal can alternatively use the first payment rail available through the payment instrument, or select the payment rail to be used in any other suitable manner.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A payment terminal, comprising:

a housing comprising:

a main processor;

a secure input device;

a first display associated with the main processor;

a secure processor; and a second display associated with the secure processor, wherein the second display is different from the first display, and the secure processor is configured to:

switch to a secured mode to receive at least one secure user input, wherein, in the secured mode, the secure input device is selectively connected to the secure processor and selectively disconnected from the main processor;

receive, via the second display, the at least one secure user input;

generate, based on the at least one secure user input, secured payment information;

encrypt, in the secured mode, the secured payment information to form encrypted secured payment information;

switch, after verification of the at least one secure user input and notification of an end of the secured mode, to an unsecured mode to receive unsecured information, wherein, in the unsecured mode, the secure input device is selectively connected to the main processor and selectively disconnected from the secure processor; and tag the encrypted secured payment information with the unsecured information to form tagged secured payment information, and wherein the main processor is configured to:

control the first display to display the unsecured information, wherein the first display is controlled based on the tagged secured payment information.

2. The payment terminal of claim 1, wherein the main processor is further configured to:

receive the tagged secured payment information from the secure processor;

extract the unsecured information and the encrypted secured payment information from the tagged secured payment information, without decryption of the encrypted secured payment information;

control the first display to display the unsecured information, wherein the first display is controlled based on the extraction of the unsecured information and the encrypted secured payment information;

transmit the encrypted secured payment information to a payment gateway; and receive a payment response corresponding to the encrypted secured payment information from the payment gateway.

3. The payment terminal of claim 2, wherein the main processor is further configured to switch the secure processor from the unsecured mode to the secured mode based on reception of a payment request.

4. The payment terminal of claim 3, wherein the secure processor is further configured to receive and forward inputs to the main processor in the unsecured mode.

5. The payment terminal of claim 2, wherein the main processor is further configured to download a third party application.

6. The payment terminal of claim 5, wherein the main processor is further configured to expose the unsecured information by:

reception of a request from the third party application for the unsecured information;

verification of the third party application with a public key certificate stored by the main processor; and based on successful verification of the third party application, provide the unsecured information to the third party application.

7. The payment terminal of claim 5, wherein the main processor is further configured to:

update the third party application with an update downloaded to the main processor;

based on the update of the third party application, prompt a merchant at the payment terminal to update a permission level for the third party application;

receive an updated permission level for the third party application from the merchant; and restrict the unsecured information provided to the third party application based on the updated permission level.

8. The payment terminal of claim 5, wherein the main processor is further configured to expose the unsecured information by:

extraction of a payment status from the payment response;

storage of the payment status in association with the unsecured information at a transaction resource; and exposure of the payment status and the unsecured information stored by the transaction resource to the third party application.

9. The payment terminal of claim 8, wherein the unsecured information comprises order information, wherein the main processor is further configured to extract the unsecured information by:

determination of a product identifier and an order quantity from the order information, and cache the product identifier and the order quantity, wherein update of the transaction resource comprises, based on the payment status indicating payment information verification, storage of the cached product identifier and the order quantity at the transaction resource, and wherein the exposure of the unsecured information to the third party application comprises providing the product identifier and the order quantity to the third party application.

10. The payment terminal of claim 2, wherein the main processor is further configured to:

based on the reception of the payment response, update a transaction resource of the main processor with the unsecured information.

11. The payment terminal of claim 1, wherein the unsecured information comprises unsecured transaction-associated information.

12. A payment processing method, comprising:

in a payment terminal comprising a housing that includes a main processor, a secure processor, a secure input device, a first display associated with the main processor, and a second display associated with the secure processor:

receiving, by the secure processor switched to a secured mode, via the second display, at least one secure user input, wherein in the secured mode, the secure input device is selectively connected to the secure processor and selectively disconnected from the main processor, and the first display is different from the second display;

generating, by the secure processor based on the at least one secure user input, secured payment information;

encrypting, by the secure processor, the secured payment information in the secured mode to form encrypted secured payment information;

receiving, by the secure processor switched to an unsecured mode after verifying the at least one secure user input and notifying an end of the secured mode, unsecured information, wherein, in the unsecured mode, the secure input device is selectively connected to the main processor and selectively disconnected from the secure processor;

tagging, by the secure processor, the encrypted secured payment information with the unsecured information to form tagged secured payment information; and controlling, by the main processor, the first display to display the unsecured information, wherein the first display is controlled based on the tagged secured payment information.

13. The payment processing method of claim 12, further comprising:

transmitting, by the secure processor, the tagged secured payment information to the main processor;

receiving, by the main processor, the tagged secured payment information;

extracting, by the main processor, the unsecured information and the encrypted secured payment information from the tagged secured payment information without decrypting the encrypted secured payment information;

controlling the first display, by the main processor, to display the unsecured information, wherein the first display is controlled based on the extraction of the unsecured information and the encrypted secured payment information;

transmitting, by the main processor, the encrypted secured payment information to a payment gateway; and receiving, by the main processor, a payment response corresponding to the encrypted secured payment information from the payment gateway.

14. The payment processing method of claim 13, further comprising switching, by the main processor, the secure processor between the secured mode and the unsecured mode based on receiving of a payment request.

15. The payment processing method of claim 14, further comprising receiving and forwarding inputs, by the secure processor, to the main processor in the unsecured mode.

16. The payment processing method of claim 13, wherein the main processor is configured to expose the unsecured information by:

receiving a request from a third party application for the unsecured information;

verifying the third party application with a public key certificate stored by the main processor; and based on successfully verifying the third party application, providing the unsecured information to the third party application.

17. The payment processing method of claim 16, further comprising exposing, by the main processor, the unsecured information by:

extracting a payment status from the payment response;

storing the payment status in association with the unsecured information at a transaction resource; and exposing the payment status and the unsecured information stored by the transaction resource to the third party application.

18. The payment processing method of claim 17, wherein the unsecured information comprises order information, wherein the main processor is configured to extract the unsecured information by:

determining a product identifier and an order quantity from the order information; and caching the product identifier and the order quantity, wherein updating the transaction resource comprises, based on the payment status indicating payment information verification, storing the cached product identifier and the order quantity at the transaction resource, and wherein the exposing the unsecured information to the third party application comprises providing the product identifier and the order quantity to the third party application.

* * * * *